US010762415B2

(12) United States Patent
Tamura et al.

(10) Patent No.: US 10,762,415 B2
(45) Date of Patent: Sep. 1, 2020

(54) INFORMATION PROCESSING APPARATUS, ISING UNIT, AND INFORMATION PROCESSING APPARATUS CONTROL METHOD

(71) Applicant: FUJITSU LIMITED, Kawasaki-shi, Kanagawa (JP)

(72) Inventors: Hirotaka Tamura, Yokohama (JP); Satoshi Matsubara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 597 days.

(21) Appl. No.: 15/690,313

(22) Filed: Aug. 30, 2017

(65) Prior Publication Data

US 2018/0075342 A1 Mar. 15, 2018

(30) Foreign Application Priority Data

Sep. 9, 2016 (JP) .................................. 2016-176040

(51) Int. Cl.
*G06N 3/063* (2006.01)
*G06N 3/04* (2006.01)

(52) U.S. Cl.
CPC ......... *G06N 3/0472* (2013.01); *G06N 3/0445* (2013.01); *G06N 3/063* (2013.01)

(58) Field of Classification Search
CPC ... G06N 3/04; G06N 3/049; G06F 2207/4824

(Continued)

(56) References Cited

U.S. PATENT DOCUMENTS 5,165,010 A * 11/1992 Masuda ................. G06N 3/063
706/42
5,202,956 A * 4/1993 Mashiko ............... G06N 3/063
706/39

(Continued)

FOREIGN PATENT DOCUMENTS

JP          3-100857       4/1991
WO       2014-192153       12/2014

OTHER PUBLICATIONS

Nicholas Metropolis et al., "Equation of State Calculations by Fast Computing Machines", The Journal of Chemical Physics, vol. 21, No. 6, Jun. 1953 (6 pages).

(Continued)

*Primary Examiner* — David R Vincent
(74) *Attorney, Agent, or Firm* — Fujitsu Patent Center

(57) ABSTRACT

Each energy value calculation circuit calculates an energy value, based on a sum total of values obtained by multiplying state values of a plurality of second neurons coupled with a first neuron by corresponding weighting values indicating coupling strengths, and updates the energy value, based on identification information of an updated neuron whose state is updated among the plurality of second neurons and a state value of the updated neuron. Each state transition determination circuit outputs, based on a second energy value and a noise value, a determination signal indicating a determination result of whether a change in a state value of the first neuron is possible. An updated neuron selection circuit selects, based on received determination signals, a first neuron a change in whose state value is possible and outputs identification information of the selected first neuron as identification information of the updated neuron.

8 Claims, 19 Drawing Sheets

(58) Field of Classification Search
USPC .................................................. 706/15, 45
See application file for complete search history.

(56) References Cited

U.S. PATENT DOCUMENTS

| | | | |
|---|---|---|---|
| 5,444,822 A * | 8/1995 | Shinohara | G06N 3/063 706/41 |
| 5,481,644 A * | 1/1996 | Inazumi | G10L 15/16 704/232 |
| 2016/0118106 A1 | 4/2016 | Yoshimura et al. | |
| 2018/0053090 A1* | 2/2018 | Voelker | G06N 3/063 |
| 2018/0314928 A1* | 11/2018 | Li | G06N 3/0454 |

OTHER PUBLICATIONS

Koji Hukushima, "Front Line of Monte Carlo Method—Method for Integration with Throwing Dice-", Proceedings of Tutorial on Information Processing based on Probabilistic Algorithm, Nov. 2003, with partial English translation (12 pages).

* cited by examiner

FIG. 8

| OUTPUT OF SELECTION CIRCUIT 40b | fg1 | fg2 | fg3 | OUTPUT OF SELECTION CIRCUIT 52 | id3 |
|---|---|---|---|---|---|
| 1 | 1 | 1 | 1 | 1 | 1, id1 |
| 1 | 1 | 0 | 1 | 1 | 1, id1 |
| 1 | 0 | 1 | 1 | 0 | 0, id2 |
| 1 | 0 | 0 | 0 | 1 | 1, id1 |
| 0 | 1 | 1 | 1 | 0 | 0, id2 |
| 0 | 1 | 0 | 1 | 1 | 1, id1 |
| 0 | 0 | 1 | 1 | 0 | 0, id2 |
| 0 | 0 | 0 | 0 | 0 | 0, id2 |

INFORMATION PROCESSING APPARATUS, ISING UNIT, AND INFORMATION PROCESSING APPARATUS CONTROL METHOD

CROSS-REFERENCE TO RELATED APPLICATION

This application is based upon and claims the benefit of priority of the prior Japanese Patent Application No. 2016-176040, filed on Sep. 9, 2016, the entire contents of which are incorporated herein by reference.

FIELD

The embodiments discussed herein are related to an information processing apparatus, an Ising unit, and an information processing apparatus control method.

BACKGROUND

A method using an Ising unit (which may also be referred to as a Boltzmann machine) using an Ising-type energy function is known as a method for solving multivariable optimization problem at which Neumann type computers are poor. An Ising unit performs a calculation by replacing a problem to be calculated with an Ising model indicative of the behavior of the spin of a magnetic material.

An Ising unit also performs modeling by the use of a neural network. In that case, each of a plurality of units (bits) included in the Ising unit functions as a neuron which outputs "0" or "1" as a state value according to the state of another bit and a weighting value (which is also referred to as a coupling coefficient) indicative of coupling strength between another bit and each bit itself. The Ising unit finds, by simulated annealing or the like, as a solution a combination of a state value of each neuron by which the minimum value of the above energy function (which is also referred to as a cost function or an objective function) is obtained.

Formerly reducing calculation time by realizing an Ising unit by hardware was proposed.

Furthermore, the following technique is proposed. Each of a plurality of Ising units realized by hardware is made to function as one neuron, and a parallel process is performed. However, update of only one of the plurality of neurons is allowed with the convergence of calculation taken into consideration.

Japanese Laid-open Patent Publication No. 03-100857
International Publication Pamphlet No. WO 2014/192153
NICHOLAS METROPOLIS, ARIANNA W. ROSENBLUTH, MARSHALL N. ROSENBLUTH, AUGUSTA H. TELLER, AND EDWARD TELLER, "Equation of State Calculations by Fast Computing Machines", THE JOURNAL OF CHEMICAL PHYSICS VOLUME 21, NUMBER 6, June, 1953

If each of a plurality of Ising units is made to function as one neuron and a parallel process is performed, one neuron whose update is allowed may randomly be selected. However, a selected neuron does not always make a state transition. There may be cases where many neurons which do not make a state transition are selected. As a result, even if a parallel process is performed, a calculation speed is not appreciably improved.

SUMMARY

According to an aspect, there is provided an information processing apparatus including a plurality of Ising units each including: a calculation circuit which calculates a second energy value obtained by updating, based on a piece of first identification information of an updated neuron whose state is updated among a plurality of second neurons coupled with a first neuron of a plurality of neurons and a second state value indicative of a state of the updated neuron, a first energy value calculated based on a sum total of values obtained by multiplying a plurality of first state values indicative of states of the plurality of second neurons by weighting values corresponding to the plurality of second neurons among a plurality of weighting values each indicative of a coupling strength between the first neuron and one of the plurality of second neurons; and a state transition determination circuit which outputs a determination signal indicative of a determination result of determining, based on the second energy value or a change amount of an energy function of a neural network at the time of a change in a state of the first neuron and a first noise value, whether a change in a third state value indicative of a state of the first neuron is possible, the plurality of Ising units outputting determination signals regarding different first neurons; and an updated neuron selection circuit which selects a first neuron of the plurality of neurons, for which the change in the third state value is determined to be possible, based on the determination signals outputted by the plurality of Ising units and which outputs a piece of second identification information of the selected first neuron as the piece of first identification information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of a generated index;

DESCRIPTION OF EMBODIMENTS

Embodiments will now be described with reference to the accompanying drawings.

First Embodiment

Figure 1:
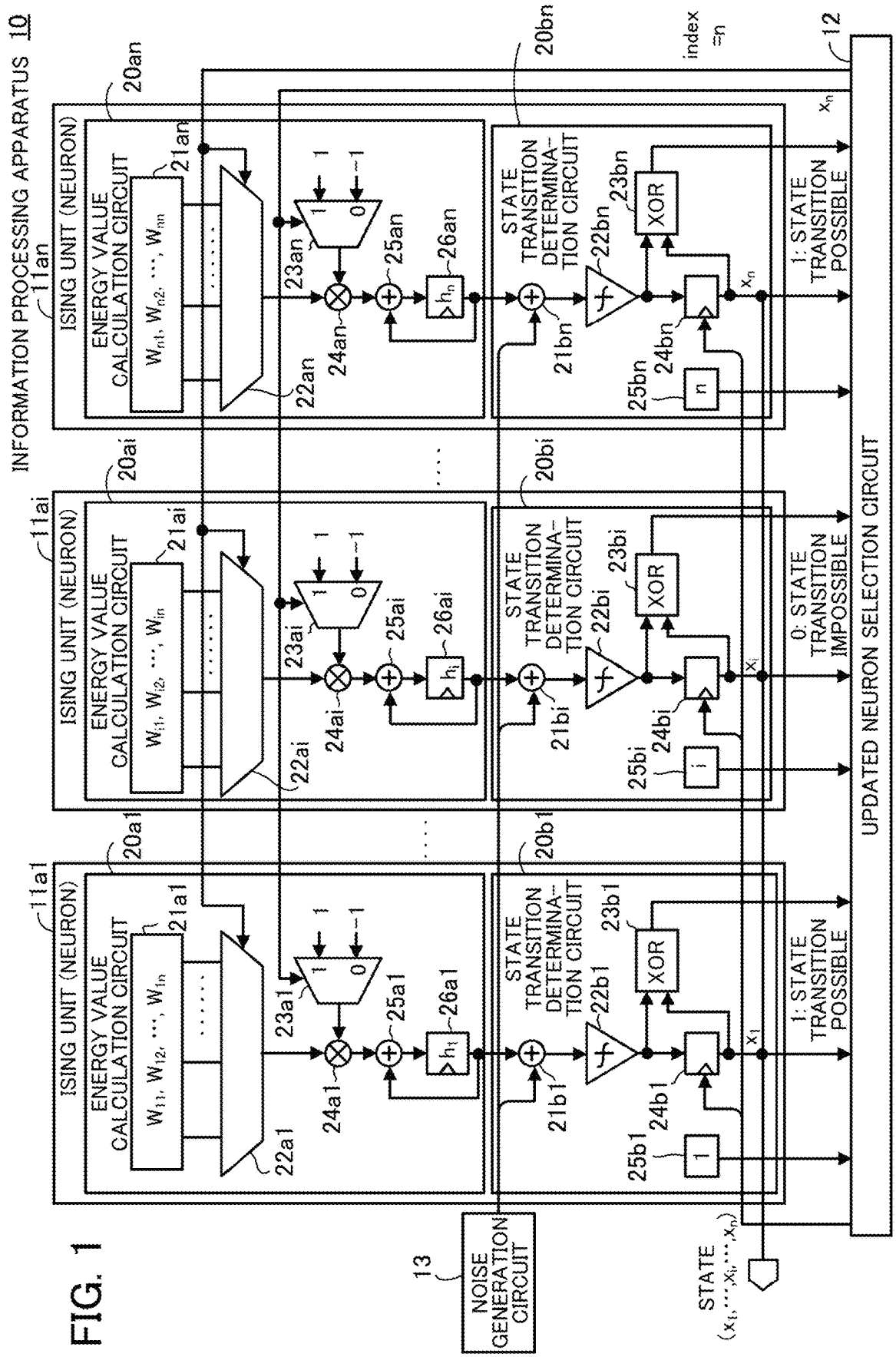
FIG. 1 illustrates an example of an information processing apparatus according to a first embodiment.

FIG. 1 illustrates an example of an information processing apparatus according to a first embodiment.

An information processing apparatus 10 includes a plurality of Ising units 11a1, ..., 11ai, ..., and 11an, an updated neuron selection circuit 12, and a noise generation circuit 13.

The Ising units 11a1 through 11an function as different neurons and output state values (0 or 1) indicative of the states of the different neurons and determination signals indicative of whether or not the state values may be changed (state transition may be made). Each of the Ising units 11a1 through 11an may be realized by one semiconductor integrated circuit (chip) or the information processing apparatus 10 itself may be realized by one chip.

Each of the Ising units 11a1 through 11an performs an operation of an Ising type energy function of a neural network by small-scale hardware based on an algorithm referred to as, for example, the DeGloria algorithm. For example, the Ising type energy function E(x) (which may be referred to hereinafter as total energy) is defined as $$E(x) = -\sum_{\langle i,j \rangle} W_{ij} x_i x_j - \sum_i b_i x_i \quad (1)$$

The first term of the right side means that the products of state values and a weighting value of two neurons are added up without omission or duplication for all combinations of two neurons selected from among all neurons. A state value $x_i$ indicates a state value of a neuron whose identification information (hereinafter represented as index) is i. $W_{ij}$ is a weighting value indicative of coupling strength between the neuron whose index is i and a neuron whose index is j. $W_{ij}=W_{ji}$ and $W_{ii}=0$.

The second term of the right side means that the product of a bias value and a state value of each of all the neurons is added up. $b_i$ indicates a bias value of the neuron whose index is i.

In order to represent the above energy function E(x) by hardware, each of the Ising units 11a1 through 11an illustrated in FIG. 1 calculates a local field (hereinafter referred to as a local field value). For example, a local field value $h_i$ of the neuron whose index is i is given by $$h_i = \sum_j W_{ij} x_j + b_i \quad (2)$$

The first term of the right side means the sum total (integrated value) of values obtained by multiplying state values of all neurons coupled with the neuron whose index is i by weighting values indicative of coupling strength between them.

It is assumed that the number of neurons of all the neurons whose state values are updated at a time is one. When a state value of a neuron is updated, a change amount resulting from the update is added to or subtracted from an original local field value of a neuron coupled with the neuron whose state value is updated.

For example, when a state value $x_j$ (0 or 1) of the neuron whose index is j and which is coupled with the neuron whose index is i changes to (1-$x_j$), a change amount $\Delta h_i$ of a local field value of the neuron whose index is i is given by $$\Delta h_i = h_i|_{x_j \rightarrow 1-x_j} - h_i = W_{ij}(1-2x_j) \quad (3)$$

In expression (3), (1-2$x_j$) becomes +1 when the state value $x_j$ changes from 0 to 1. (1-2$x_j$) becomes −1 when the state value $x_j$ changes from 1 to 0.

In addition, a change amount $\Delta E_i$ of the energy function (total energy) at the time of a change of a state value $x_i$ of the neuron whose index is i is given by $$\Delta E_i = \delta x_i \cdot h_i \quad (4)$$

In expression (4), $\delta x_1$ is a variable. $\delta x_1$ becomes +1 when the state value $x_i$ changes from 0 to 1. $\delta x_i$ becomes −1 when the state value $x_i$ changes from 1 to 0. Therefore, if a local field value $h_i$ is smaller than 0, then the total energy decreases by updating the state value $x_i$ from 0 to 1. If the local field value $h_i$ is greater than 0, then the total energy decreases by updating the state value $x_i$ from 1 to 0.

The information processing apparatus 10 outputs a combination of state values $x_1$ through $x_n$ which minimize an energy value as a solution. However, in order to prevent a solution from being trapped into a local solution which does not minimize an energy value, a noise value is used. That is to say, the information processing apparatus 10 updates the state values $x_1$ through $x_n$ according to whether values obtained by adding a noise value to local field values $h_1$ through $h_n$ are 0 or 1.

The above information processing apparatus 10 is realized by, for example, the following hardware.

As illustrated in FIG. 1, the Ising unit 11a1 includes an energy value calculation circuit 20a1 and a state transition determination circuit 20b1.

The energy value calculation circuit 20a1 calculates a first energy value on the basis of the sum total of values obtained by multiplying state values of a plurality of neurons coupled with a neuron whose index is 1 by weighting values indicative of coupling strength. In addition, on the basis of an index of a neuron, of the plurality of neurons, whose state is updated (hereinafter referred to as the updated neuron) and a state value indicative of the state after the update of the updated neuron, the energy value calculation circuit 20a1 updates the first energy value and calculates a second energy value. The first energy value and the second energy value correspond to the above local field value.

The energy value calculation circuit 20a1 includes a register 21a1, selection circuits 22a1 and 23a1, a multiplier 24a1, an adder 25a1, and a register 26a1.

The register 21a1 stores n weighting values $W_{11}$, $W_{12}$, ..., and $W_{1n}$.

The weighting values $W_{11}$, $W_{12}$, ..., and $W_{1n}$ indicate coupling strength between the neuron whose index is 1 and other neurons (neurons whose indexes are 2 through n). For example, if the neuron whose index is 1 is not coupled with the neuron whose index is 2, then the weighting value $W_{12}$ is 0. If the neuron whose index is 1 is coupled with the neuron whose index is 2, then the weighting value $W_{12}$ is 1.

The above weighting values are calculated in advance according to a problem to be calculated by a control unit (not illustrated) in the information processing apparatus 10 or an apparatus outside the information processing apparatus 10 and are stored in the register 21a1. The above weighting values may be stored in a memory such as a random access memory (RAM).

On the basis of an index outputted by the updated neuron selection circuit 12, the selection circuit 22a1 selects one of the weighting values $W_{11}$ through $W_{1n}$ stored in the register 21a1 and outputs it.

For example, when index=n is inputted to the selection circuit 22a1, the selection circuit 22a1 selects the weighting value $W_{1n}$.

The selection circuit 23a1 realizes an operation of $(1-2x_j)$ of expression (3). On the basis of a state value after update of a neuron (update of whose state is allowed) selected by the updated neuron selection circuit 12, the selection circuit 23a1 selects 1 or −1 and outputs it. When a state value after update is 0, the selection circuit 23a1 selects −1 and outputs it. When a state value after update is 1, the selection circuit 23a1 selects 1 and outputs it.

The multiplier 24a1 outputs the product of a weighting value outputted by the selection circuit 22a1 and a value outputted by the selection circuit 23a1.

The adder 25a1 adds together a value outputted by the multiplier 24a1 and a value stored in the register 26a1 and outputs a value obtained.

The register 26a1 stores a value outputted by the adder 25a1 in synchronization with a clock signal (not illustrated). The register 26a1 is, for example, a flip-flop. An initial value of a value stored in the register 26a1 is a bias value described later.

A value stored in the register 26a1 is the above local field value and is indicated by $h_1$ in FIG. 1.

The state transition determination circuit 20b1 calculates a state value $x_1$ of the neuron whose index is 1 on the basis of the local field value $h_1$ and a noise value supplied from the noise generation circuit 13, determines whether or not a change in the state value $x_1$ of the neuron whose index is 1 is possible, and outputs a determination signal indicative of a determination result.

The state transition determination circuit 20b1 includes an adder 21b1, a comparator circuit 22b1, an exclusive-OR (XOR) circuit 23b1, and registers 24b1 and 25b1.

The adder 21b1 adds a noise value outputted by the noise generation circuit 13 to the local field value $h_1$ outputted by the register 26a1 and outputs a value obtained.

When a value outputted by the adder 21b1 is greater than or equal to a threshold (0, for example), the comparator circuit 22b1 outputs 0. When a value outputted by the adder 21b1 is smaller than the threshold, the comparator circuit 22b1 outputs 1.

On the basis of a value outputted by the comparator circuit 22b1 and a value stored in the register 24b1, the XOR circuit 23b1 outputs a determination signal. For example, when the value outputted by the comparator circuit 22b1 matches the value stored in the register 24b1, the XOR circuit 23b1 outputs as a determination signal 0 which is indicative that a state value does not change. When the value outputted by the comparator circuit 22b1 differs from the value stored in the register 24b1, the XOR circuit 23b1 outputs as a determination signal 1 which is indicative that a change of state value is possible.

When the logical level of a pulse signal outputted by the updated neuron selection circuit 12 becomes, for example, a high (H) level, the register 24b1 stores a value outputted by the comparator circuit 22b1. As a result, the state value $x_1$ outputted by the Ising unit 11a1 of the neuron whose index is 1 is updated.

The register 25b1 holds index=1 outputted by the Ising unit 11a1. An index may be generated by the updated neuron selection circuit 12.

The circuit structure of the Ising units 11a2 through 11an is the same as that of the Ising unit 11a1.

That is to say, the Ising unit 11ai also includes an energy value calculation circuit 20ai and a state transition determination circuit 20bi. Like the energy value calculation circuit 20a1, the energy value calculation circuit 20ai includes a register 21ai, selection circuits 22ai and 23ai, a multiplier 24ai, an adder 25ai, and a register 26ai and calculates a local field value $h_i$. Like the state transition determination circuit 20b1, the state transition determination circuit 20bi includes an adder 21bi, a comparator circuit 22bi, an XOR circuit 23bi, and registers 24bi and 25bi. Furthermore, the state transition determination circuit 20bi calculates a state value $x_i$ of a neuron whose index is i and outputs a determination signal indicative of whether or not a change in the state value $x_i$ is possible.

Furthermore, the Ising unit 11an also includes an energy value calculation circuit 20an and a state transition determination circuit 20bn. Like the energy value calculation circuit 20a1, the energy value calculation circuit 20an includes a register 21an, selection circuits 22an and 23an, a multiplier 24an, an adder 25an, and a register 26an and calculates a local field value $h_n$. Like the state transition determination circuit 20b1, the state transition determination circuit 20bn includes an adder 21bn, a comparator circuit 22bn, an XOR circuit 23bn, and registers 24bn and 25bn. Furthermore, the state transition determination circuit 20bn calculates a state value $x_n$ of a neuron whose index is n and outputs a determination signal indicative of whether or not a change in the state value $x_n$ is possible.

The updated neuron selection circuit 12 receives the state values $x_1$ through $x_n$ outputted by the registers 24b1 through 24bn, respectively, and indexes=1 through n stored in the registers 25b1 through 25bn respectively. If on the basis of the determination signals outputted by the state transition determination circuits 20b1 through 20bn included in the Ising units 11a1 through 11an respectively, there are neurons a change in whose state values is possible, then the updated neuron selection circuit 12 selects one of them. Furthermore, the updated neuron selection circuit 12 outputs an index and a state value after update of the selected neuron as an index and a state value to be supplied to the energy value calculation circuits 20a1 through 20an.

For example, it is assumed that the updated neuron selection circuit 12 receives from the Ising unit 11a1 a determination signal which is indicative that a change in the state value $x_1$ is possible, receives from the Ising unit 11an a determination signal which is indicative that a change in the state value $x_n$ is possible, and receives from each of the other Ising units a determination signal which is indicative that a state value does not change. At this time the updated neuron selection circuit 12 randomly selects, on the basis of random number values or the like, one of the neuron whose index is 1 and a change in whose state value $x_1$ is possible and the neuron whose index is n and a change in whose state value $x_n$ is possible, and outputs an index and a state value of the selected neuron.

In the example of FIG. 1, index=n and the state value $x_n$ are outputted from the updated neuron selection circuit 12. At this time the updated neuron selection circuit 12 makes the logical level of a pulse signal supplied to the register 24*bn* of the Ising unit 11*an* an H level so that the state value $x_n$ will be stored. As a result, the state value $x_n$ of the state values $x_1$ through $x_n$ is updated.

In order to perform simulated annealing, the noise generation circuit 13 generates a noise value. For example, a linear feedback shift register (LFSR) is used as the noise generation circuit 13. An example of a noise value will be described later.

Example of Operation of Information Processing Apparatus According to First Embodiment An example of the operation of the information processing apparatus 10 according to the first embodiment will now be described by the use of a flow chart.

Figure 2:
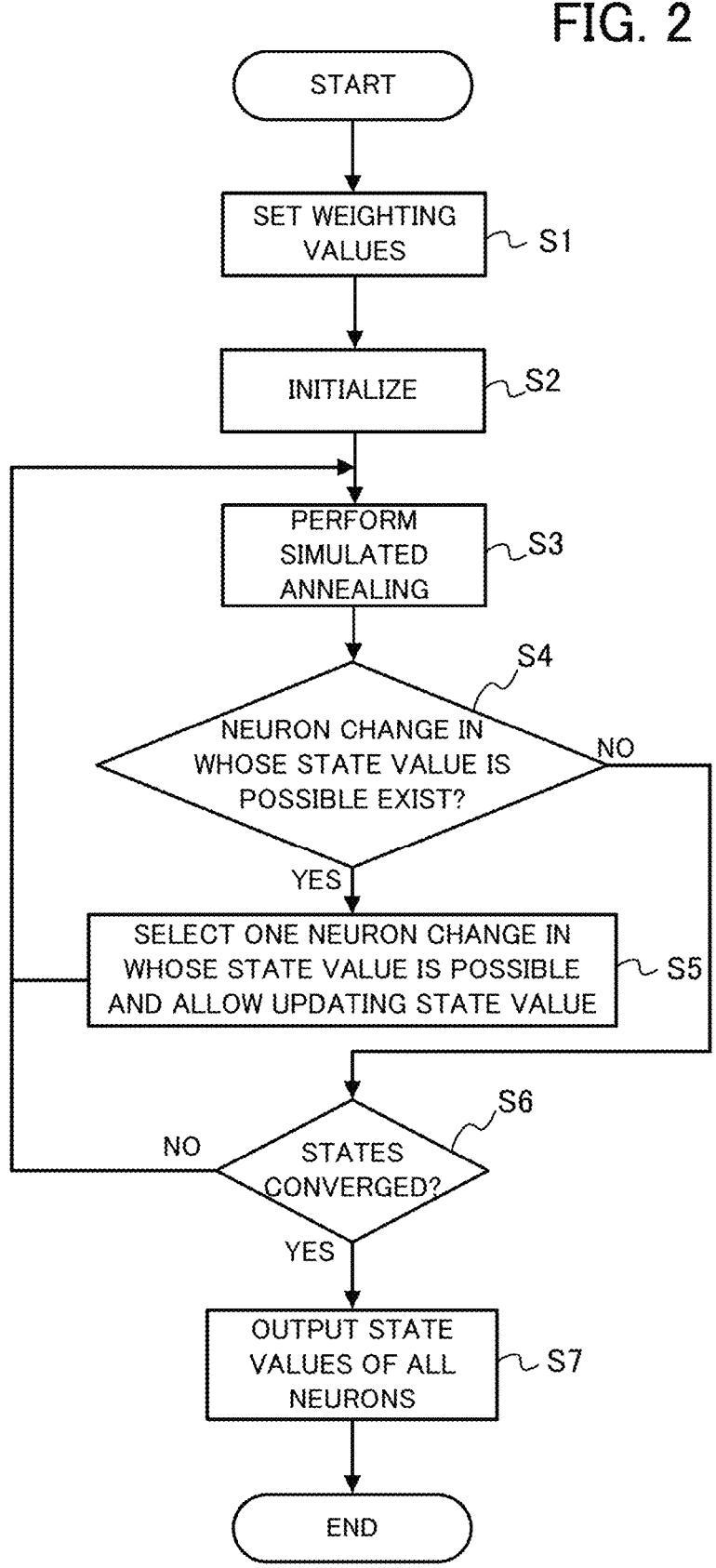
FIG. 2 is a flow chart illustrative of an example of the operation of the information processing apparatus.

FIG. 2 is a flow chart illustrative of an example of the operation of the information processing apparatus.

First, for example, a control unit (not illustrated) sets weighting values corresponding to a problem to be calculated in the registers 21*a*1 through 21*an* (step S1) and the Ising units 11*a*1 through 11*an* are initialized (step S2). In step S2, for example, bias values are set in the registers 26*a*1 through 26*an* and the registers 24*b*1 through 24*bn* are reset (initial values are set).

After that, simulated annealing is performed under the control of the control unit (step S3).

At the time of the simulated annealing, the noise generation circuit 13 gradually decreases noise width under the control of the control unit.

The noise generation circuit 13 generates a noise value so that, for example, the probability that output values of the comparator circuits 22*b*1 through 22*bn* (state values $x_1$ through $x_n$) become 1 will follow a sigmoid function. The noise generation circuit 13 generates a noise value so that, for example, a probability value $P_i(h_i)$ at which a state value $x_i$ of a neuron whose index is i becomes 1 will be given by $$P_i(h_i)=1/[1+\exp(-h_i/T)] \quad (5)$$

where T is effective temperature.

In order to obtain the probability value $P_i(h_i)$ given by expression (5), a probability density function p(ns) of a noise value ns to be added is given by $$p(ns)=\exp(-h_i/T)/[1+\exp(-h_i/T)]^2 \quad (6)$$

Figure 3:
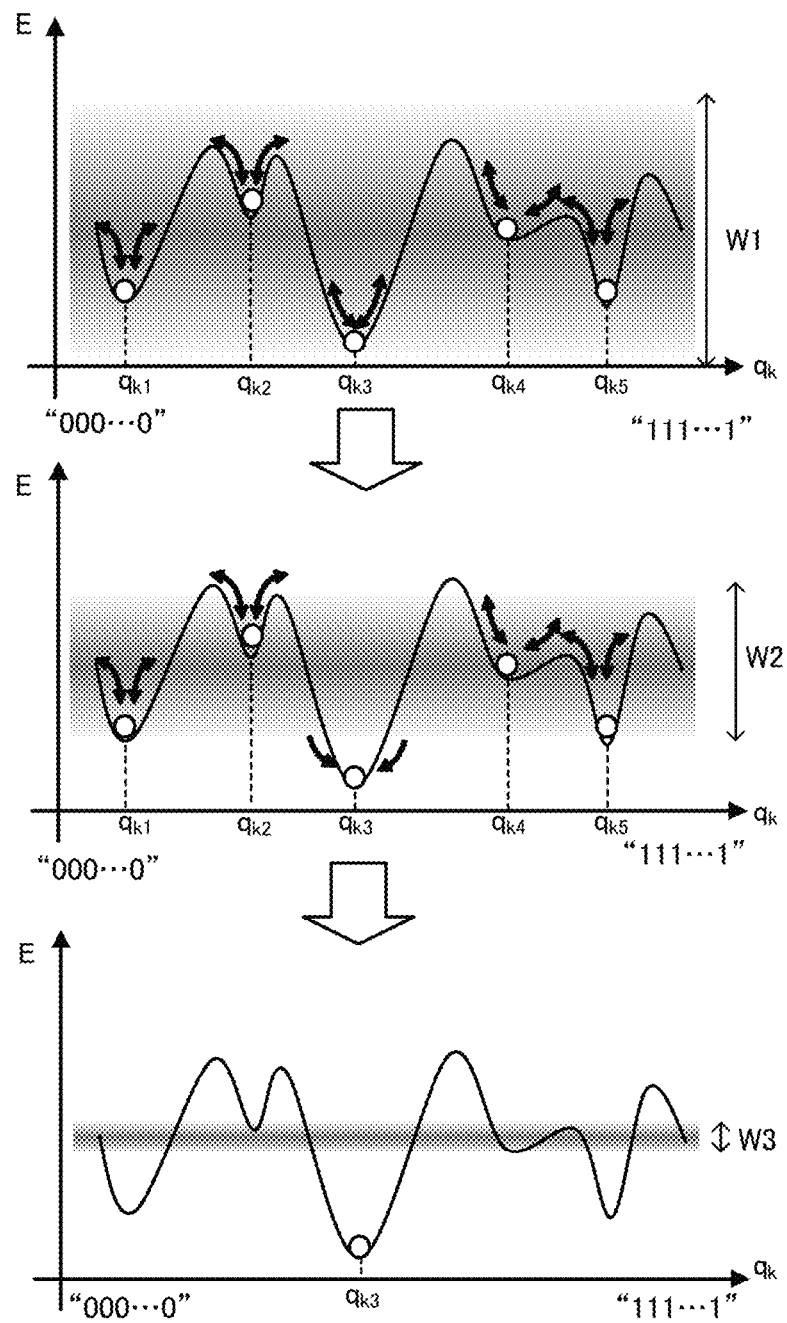
FIG. 3 illustrates the state of simulated annealing.

FIG. 3 illustrates the state of the simulated annealing.

In FIG. 3, a vertical axis indicates energy E and a horizontal axis indicates a combination $q_k$ of output values of all the neurons. Combinations $q_k$ are "000 . . . 0" to "11 . . . 1". FIG. 3 illustrates the state of the convergence of a solution. In the case of FIG. 3, noise width is decreased from W1 to W2 and from W2 to W3. A decrease in noise width corresponds to a decrease in the effective temperature T of expression (6).

Even if a solution is trapped into a local solution (solution by which energy becomes a local minimum value) $q_{k1}$, $q_{k2}$, $q_{k4}$, or $q_{k5}$ at the time of noise width being W1, a change in a direction in which energy increases is possible. Therefore, it is possible to escape from a local solution. When noise width is gradually decreased from W1 to W2 and from W2 to W3, a change in solution is limited. A solution finally converges to an optimal solution (solution by which energy becomes a minimum value) $q_{k3}$.

At the time of the simulated annealing, each of the state transition determination circuits 20*b*1 through 20*bn* included in the Ising units 11*a*1 through 11*an*, respectively, determines whether or not there is a neuron a change in whose state value is possible (step S4). If there is no neuron a change in whose state value is possible, then step S6 is performed.

If there is a neuron a change in whose state value is possible, then the updated neuron selection circuit 12 selects one neuron a change in whose state value is possible and allows updating the state value (step S5). For example, if in step S5 there are a plurality of neurons a change in whose state values is possible, then the updated neuron selection circuit 12 randomly selects one of them. Furthermore, the updated neuron selection circuit 12 makes the logical level of a pulse signal supplied to a register (one of the registers 24*b*1 through 24*bn*) of an Ising unit to which a state value of the selected neuron is outputted an H level so that the register will store the state value of the selected neuron. The updated neuron selection circuit 12 then outputs an index of the selected neuron and a state value after update (after a change) which the register stores. After step S5 is performed, step S3 is performed again.

If there is no neuron a change in whose state value is possible, then the control unit determines whether or not the states of the n neurons have converged (step S6). For example, when state values of the n neurons do not change for a certain period, the control unit determines that the states of the n neurons have converged, makes the information processing apparatus 10 output the state values of all the neurons (combination of the state values) as a solution (step S7), and ends the process. For example, when state values of the n neurons change in the certain period, the process is repeated from step S3.

The information processing apparatus 10 may output the states of all the neurons to the outside of the information processing apparatus 10 or store the states of all the neurons in a memory (not illustrated) in the information processing apparatus 10.

According to the above information processing apparatus 10, the updated neuron selection circuit 12 selects a neuron updating whose state value is allowed. At this time the updated neuron selection circuit 12 detects neurons a change in whose state values is possible on the basis of a noise value and a local field value of each neuron and selects one of them. This increases the probability that a state transition will occur, and improves calculation speed. Furthermore, if there are a plurality of neurons a change in whose state values is possible, one of them is selected and updating its state value is allowed. This suppresses deterioration of convergence.

In addition, when a state value of some neuron is updated, a neuron, of the n neurons, a change in whose state value is possible is checked at once in parallel by the Ising units 11*a*1 through 11*an*. That is to say, a plurality of neighbor states to which the transition may be made from the current state are checked at once in parallel. This enables high-speed processing corresponding to the number of the Ising units 11*a*1 through 11*an* (connected in parallel).

Second Embodiment

Figure 4:
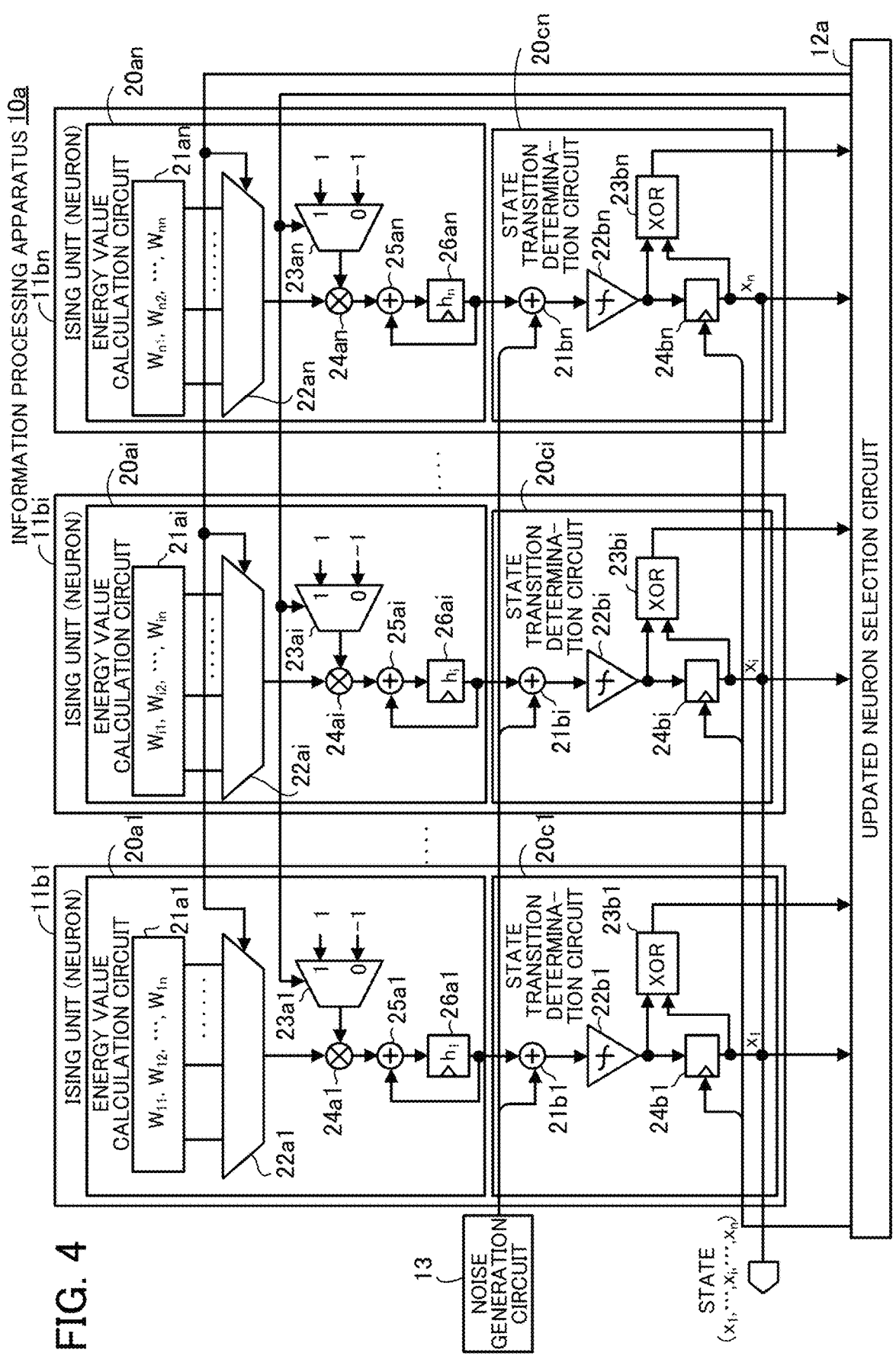
FIG. 4 illustrates an example of an information processing apparatus according to a second embodiment.

FIG. 4 illustrates an example of an information processing apparatus according to a second embodiment. Components in FIG. 4 which are the same as those of the information processing apparatus 10 according to the first embodiment illustrated in FIG. 1 are marked with the same numerals.

State transition determination circuits 20*c*1, . . . , 20*ci*, . . . , 20*cn* included in Ising units 11*b*1, . . . , 11*bi*, . . . , 11*bn*, respectively, of an information processing apparatus 10*a* according to a second embodiment differ from the state transition determination circuits 20b1 through 20bn in the first embodiment. The registers 25b1 through 25bn are included in the state transition determination circuits 20b1 through 20bn, respectively, in the first embodiment. However, registers 25b1 through 25bn are not included in the state transition determination circuits 20c1 through 20cn respectively.

With the information processing apparatus 10a according to the second embodiment an updated neuron selection circuit 12a generates an index instead. An example of the updated neuron selection circuit 12a at the time of n=1024 will now be described.

Figure 5:
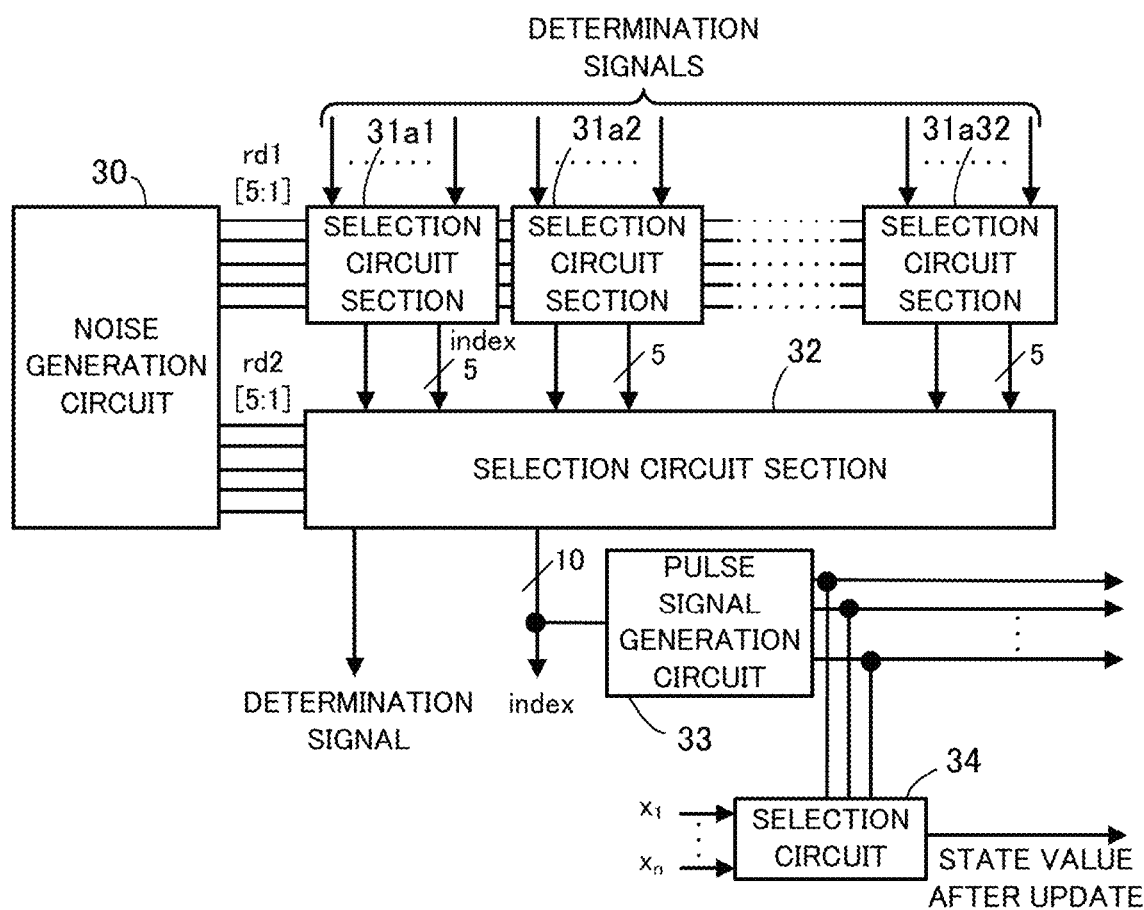
FIG. 5 illustrates an example of an updated neuron selection circuit.

FIG. 5 illustrates an example of the updated neuron selection circuit.

The updated neuron selection circuit 12a includes a noise generation circuit 30, selection circuit sections 31a1, 31a2, . . . , 31a32, and 32, a pulse signal generation circuit 33, and a selection circuit 34.

The noise generation circuit 30 generates and outputs 5-bit random number values rd1 and rd2 as noise values. The random number values rd1 and rd2 differ in seed (initial value). For example, an LFSR is used as the noise generation circuit 30.

1024 determination signals outputted by the Ising units 11b1 through 11bn (n=1024) are inputted to the selection circuit sections 31a1 through 31a32. 32 determination signals are inputted to each of the selection circuit sections 31a1 through 31a32. On the basis of the 5-bit random number value rd1, each of the selection circuit sections 31a1 through 31a32 selects and outputs one of 32 determination signals. Furthermore, each of the selection circuit sections 31a1 through 31a32 generates and outputs a 5-bit index indicative of an Ising unit, of 32 Ising units, which outputs the selected determination signal.

A determination signal and a 5-bit index outputted by each of the selection circuit sections 31a1 through 31a32 are inputted to the selection circuit section 32. On the basis of the determination signals, the indexes, and the 5-bit random number value rd2, the selection circuit section 32 selects and outputs one of the 32 determination signals and generates and outputs a 10-bit index.

On the basis of the 10-bit index, the pulse signal generation circuit 33 makes the logical level of a pulse signal supplied to one of registers 24b1 through 24bn included in the state transition determination circuits 20c1 through 20cn of the Ising units 11b1 through 11bn, respectively, an H level.

On the basis of the pulse signal outputted by the pulse signal generation circuit 33, the selection circuit 34 selects and outputs a state value outputted by the register, of the registers 24b1 through 24bn, to which the H-level pulse signal is supplied.

Figure 6:
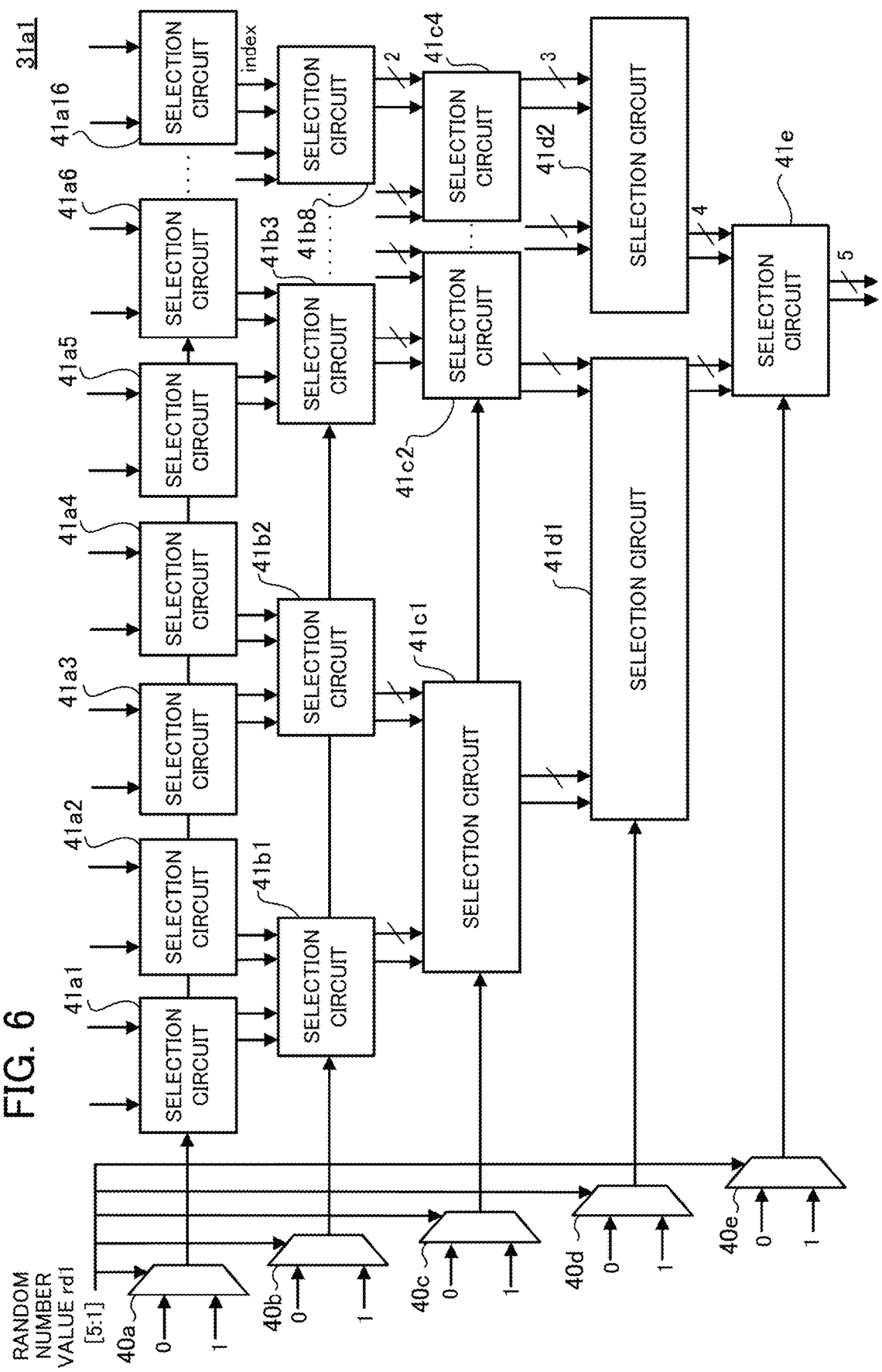
FIG. 6 illustrates an example of a selection circuit section.

FIG. 6 illustrates an example of a selection circuit section.

FIG. 6 illustrates an example of the selection circuit section 31a1. The selection circuit sections 31a2 through 31a32 are also realized by the same circuit that is used in the selection circuit section 31a1.

The selection circuit sections 31a1 includes selection circuits 40a, 40b, 40c, 40d, and 40e. Furthermore, the selection circuit sections 31a1 includes selection circuits 41a1, 41a2, 41a3, 41a4, 41a5, 41a6, . . . , 41a16, 41b1, 41b2, 41b3, . . . , 41b8, 41c1, 41c2, . . . , 41c4, 41d1, 41d2, and 41e. The selection circuits 41a1 through 41a16, 41b1 through 41b8, 41c1 through 41c4, 41d1, 41d2, and 41e are connected to form a five-stage tree structure.

On the basis of a value of a first bit of the 5-bit random number value rd1, the selection circuit 40a supplies 0 or 1 to the selection circuits 41a1 through 41a16 at the first stage.

On the basis of a value of a second bit of the 5-bit random number value rd1, the selection circuit 40b supplies 0 or 1 to the selection circuits 41b1 through 41b8 at the second stage.

On the basis of a value of a third bit of the 5-bit random number value rd1, the selection circuit 40c supplies 0 or 1 to the selection circuits 41c1 through 41c4 at the third stage.

On the basis of a value of a fourth bit of the 5-bit random number value rd1, the selection circuit 40d supplies 0 or 1 to the selection circuits 41d1 and 41d2 at the fourth stage.

On the basis of a value of a fifth bit of the 5-bit random number value rd1, the selection circuit 40e supplies 0 or 1 to the selection circuit 41e at the fifth stage.

The selection circuits 41a1 through 41a16 at the first stage input 32 determination signals of the 1024 determination signals outputted by the Ising units 11b1 through 11bn. Each of the selection circuits 41a1 through 41a16 inputs 2 determination signals of the 32 determination signals. On the basis of values of the determination signals and 0 or 1 outputted by the selection circuit 40a, each of the selection circuits 41a1 through 41a16 selects and outputs one of the 2 determination signals and generates and outputs a 1-bit index indicative of which determination signal is selected.

The selection circuits 41b1 through 41b8 at the second stage input 16 determination signals and 16 indexes outputted by the selection circuits 41a1 through 41a16. Each of the selection circuits 41b1 through 41b8 inputs 2 determination signals and 2 indexes. On the basis of values of the determination signals and 0 or 1 outputted by the selection circuit 40b, each of the selection circuits 41b1 through 41b8 selects and outputs one of the 2 determination signals and generates and outputs a 2-bit index indicative of which determination signal is selected.

The selection circuits 41c1 through 41c4 at the third stage input 8 determination signals and 8 indexes outputted by the selection circuits 41b1 through 41b8. Each of the selection circuits 41c1 through 41c4 inputs 2 determination signals and 2 indexes. On the basis of values of the determination signals and 0 or 1 outputted by the selection circuit 40c, each of the selection circuits 41c1 through 41c4 selects and outputs one of the 2 determination signals and generates and outputs a 3-bit index indicative of which determination signal is selected.

The selection circuits 41d1 and 41d2 at the fourth stage input 4 determination signals and 4 indexes outputted by the selection circuits 41c1 through 41c4. Each of the selection circuits 41d1 and 41d2 inputs 2 determination signals and 2 indexes. On the basis of values of the determination signals and 0 or 1 outputted by the selection circuit 40d, each of the selection circuits 41d1 and 41d2 selects and outputs one of the 2 determination signals and generates and outputs a 4-bit index indicative of which determination signal is selected.

The selection circuit 41e at the fifth stage inputs 2 determination signals and 2 indexes outputted by the selection circuits 41d1 and 41d2. On the basis of values of the determination signals and 0 or 1 outputted by the selection circuit 40e, the selection circuit 41e selects and outputs one of the 2 determination signals and generates and outputs a 5-bit index indicative of which determination signal is selected.

The selection circuit section 32 illustrated in FIG. 5 is also realized by approximately the same circuit structure that is adopted in the selection circuit section 31a1. However, 32 determination signals outputted by the selection circuit sections 31a1 through 31a32 are inputted to selection circuits 41a1 through 41a16 at the first stage and 2 determination signals are inputted to each of the selection circuits 41a1 through 41a16. Furthermore, 32 (5-bit) indexes outputted by the selection circuit sections 31a1 through 31a32 are inputted to the selection circuits 41a1 through 41a16 and 2 indexes are inputted to each of the selection circuits 41a1 through 41a16. At each stage, determination signals are selected and a bit is added to indexes. As a result, a 10-bit index and a determination signal finally selected are outputted. In the example of the updated neuron selection circuit 12a illustrated in FIG. 5, a determination signal outputted from the selection circuit section 32 is not used. Therefore, there is no need for the selection circuit section 32 to output a determination signal.

Figure 7:
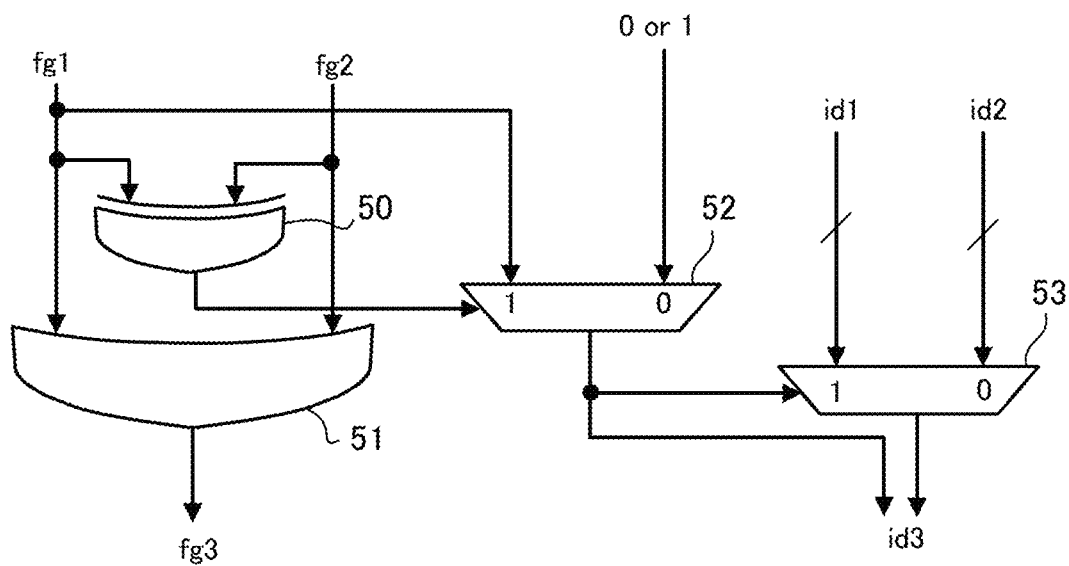
FIG. 7 illustrates an example of a selection circuit.

FIG. 7 illustrates an example of a selection circuit.

FIG. 7 illustrates an example of the selection circuit 41b1 illustrated in FIG. 6. The selection circuits 41b2 through 41b8, 41c1 through 41c4, 41d1, 41d2, and 41e are also realized by adopting the same circuit structure.

The selection circuit 41b1 includes an XOR circuit 50, an OR circuit 51, and selection circuits 52 and 53.

The XOR circuit 50 inputs determination signals outputted by the selection circuits 41a1 and 41a2 at the preceding stage. In FIG. 7, a determination signal outputted by the selection circuit 41a1 is indicated by fg1 and a determination signal outputted by the selection circuit 41a2 is indicated by fg2. If values of fg1 and fg2 match, then the XOR circuit 50 outputs 0. If values of fg1 and fg2 do not match, then the XOR circuit 50 outputs 1.

The OR circuit 51 inputs fg1 and fg2. If one of fg1 and fg2 is 1 or both of fg1 and fg2 are 1, then the OR circuit 51 outputs 1 as a determination signal (indicated by fg3). If both of fg1 and fg2 are 0, then the OR circuit 51 outputs 0 as fg3. That is to say, if fg1 is 1 and fg2 is 0, then fg1 is equal to fg3. If fg1 is 0 and fg2 is 1, then fg2 is equal to fg3.

The selection circuit 52 inputs fg1 and 0 or 1 outputted by the selection circuit 40b. When an output of the XOR circuit 50 is 1, the selection circuit 52 selects and outputs a value of fg1. When an output of the XOR circuit 50 is 0, the selection circuit 52 selects and outputs a value outputted by the selection circuit 40b.

The selection circuit 53 inputs indexes outputted by the selection circuits 41a1 and 41a2 at the preceding stage. In FIG. 7, an index outputted by the selection circuit 41a1 is indicated by id1 and an index outputted by the selection circuit 41a2 is indicated by id2. When an output of the selection circuit 52 is 1, the selection circuit 53 selects and outputs a value of id1. When an output of the selection circuit 52 is 0, the selection circuit 53 selects and outputs a value of id2.

The selection circuit 41b1 outputs an index (indicated by id3 in FIG. 7) obtained by adding a 1-bit output of the selection circuit 52 (as a high-order bit) to the value of id1 or id2 outputted by the selection circuit 53.

The selection circuits 41a1 through 41a16 at the first stage illustrated in FIG. 6 are also realized by approximately the same circuit structure that is illustrated in FIG. 7. However, the selection circuit 53 is not included.

FIG. 8 illustrates an example of a generated index.

When an output of the selection circuit 40b is 1 and values of the two input determination signals (fg1 and fg2) are the same in the selection circuit 41b1 illustrated in FIG. 7, id3 becomes a value obtained by newly adding bit=1 as a high-order bit of id1. Furthermore, when an output of the selection circuit 40b is 1, values of fg1 and fg2 are different, and the value of fg1 is 1, id3 also becomes a value obtained by newly adding bit=1 as a high-order bit of id1. In addition, when an output of the selection circuit 40b is 1, values of fg1 and fg2 are different, and the value of fg1 is 0, id3 becomes a value obtained by newly adding bit=0 as a high-order bit of id2.

When an output of the selection circuit 40b is 0 and values of fg1 and fg2 are the same, id3 becomes a value obtained by newly adding bit=0 as a high-order bit of id2. Furthermore, when an output of the selection circuit 40b is 0, values of fg1 and fg2 are different, and the value of fg1 is 1, id3 becomes a value obtained by newly adding bit=1 as a high-order bit of id1. In addition, when an output of the selection circuit 40b is 0, values of fg1 and fg2 are different, and the value of fg1 is 0, id3 becomes a value obtained by newly adding bit=0 as a high-order bit of id2.

Moreover, when one of fg1 and fg2 is 1 or both of fg1 and fg2 are 1, fg3 is 1. When both of fg1 and fg2 are 0, fg3 is 0.

Figure 9:
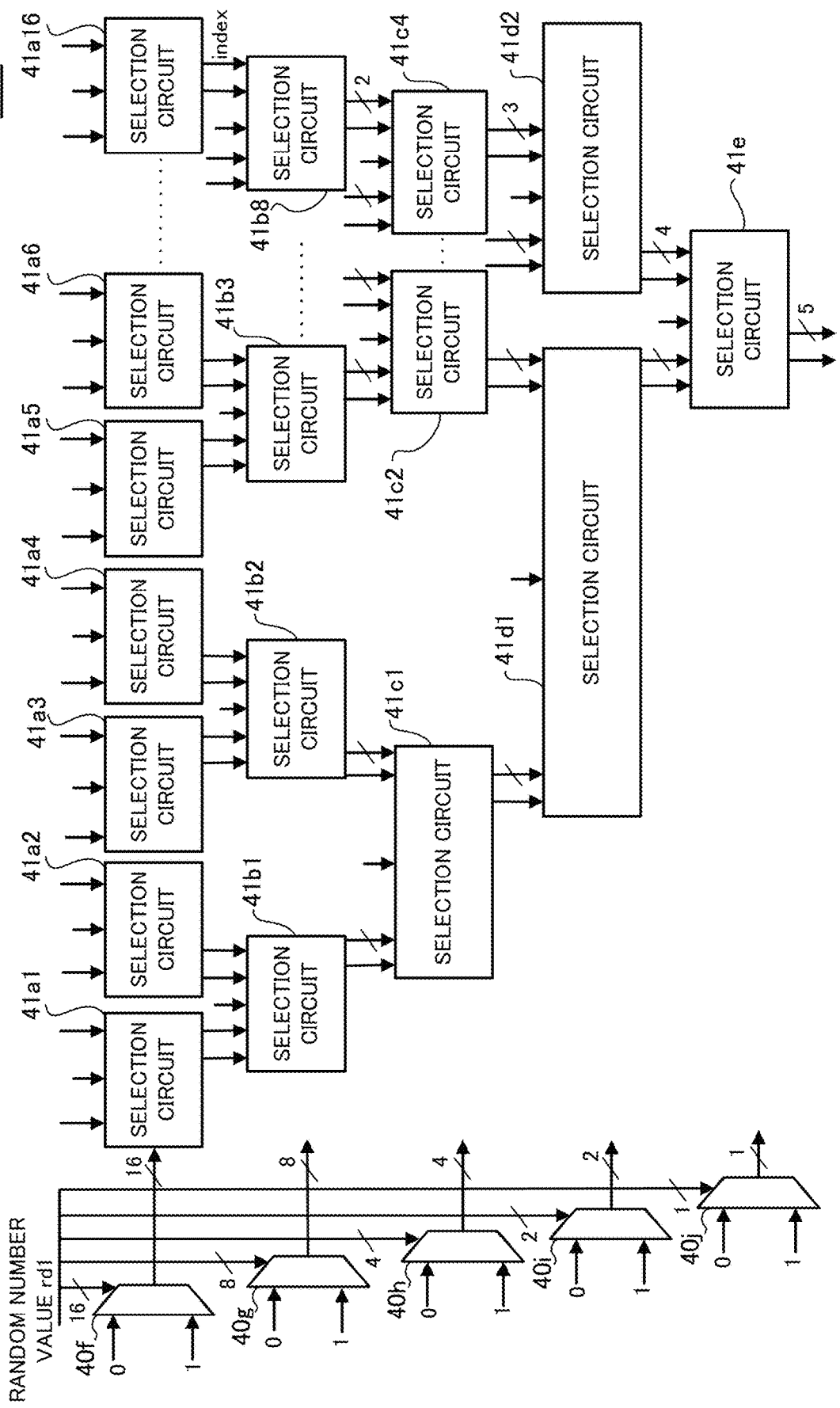
FIG. 9 illustrates another example of a selection circuit section.

FIG. 9 illustrates another example of a selection circuit section.

A selection circuit section 31b1 illustrated in FIG. 9 may be used in place of the selection circuit section 31a1 illustrated in FIG. 6.

Selection circuits 40f, 40g, 40h, 40i, and 40j of the selection circuit section 31b1 differ from the selection circuits 40a through 40e of the selection circuit section 31a1.

On the basis of a 16-bit random number value rd1, the selection circuit 40f supplies a 16-bit value in which a value of each bit is 0 or 1 to selection circuits 41a1 through 41a16 at a first stage. For example, a value of the least significant bit of the 16-bit value is supplied to the selection circuit 41a1 and a value of the most significant bit of the 16-bit value is supplied to the selection circuit 41a16.

On the basis of an 8-bit value of the 16-bit random number value rd1, the selection circuit 40g supplies an 8-bit value in which a value of each bit is 0 or 1 to selection circuits 41b1 through 41b8 at a second stage. For example, a value of the least significant bit of the 8-bit value is supplied to the selection circuit 41b1 and a value of the most significant bit of the 8-bit value is supplied to the selection circuit 41b8.

On the basis of a 4-bit value of the 16-bit random number value rd1, the selection circuit 40h supplies a 4-bit value in which a value of each bit is 0 or 1 to selection circuits 41c1 through 41c4 at a third stage. For example, a value of the least significant bit of the 4-bit value is supplied to the selection circuit 41c1 and a value of the most significant bit of the 4-bit value is supplied to the selection circuit 41c4.

On the basis of a 2-bit value of the 16-bit random number value rd1, the selection circuit 40i supplies a 2-bit value in which a value of each bit is 0 or 1 to selection circuits 41d1 and 41d2 at a fourth stage. For example, a value of the least significant bit of the 2-bit value is supplied to the selection circuit 41d1 and a value of the most significant bit of the 2-bit value is supplied to the selection circuit 41d2.

On the basis of a 1-bit value of the 16-bit random number value rd1, the selection circuit 40j supplies a 1-bit value in which a value of the bit is 0 or 1 to a selection circuit 41e at a fifth stage.

With the selection circuit section 31a1 illustrated in FIG. 6, the same value based on the random number value rd1 is supplied to a plurality of selection circuits at the same stage. Like the selection circuit section 31b1 illustrated in FIG. 9, however, different values based on the random number value rd1 may be supplied to a plurality of selection circuits at the same stage.

The selection circuit sections 31a2 through 31a32 are also realized by the same circuit that is used in the selection circuit section 31b1. The selection circuit section 32 illustrated in FIG. 5 is also realized by approximately the same circuit structure that is adopted in the selection circuit section 31b1.

The rest of the structure of the information processing apparatus 10a according to the second embodiment is the same as that of the information processing apparatus 10 according to the first embodiment.

Therefore, the same effect that is obtained by the information processing apparatus 10 according to the first embodiment is achieved by the information processing apparatus 10a according to the second embodiment.

Furthermore, with the information processing apparatus 10a according to the second embodiment the updated neuron selection circuit 12a generates an index. This obviates the need to place in the Ising units 11b1 through 11bn registers which hold indexes. The number of bits included in an index increases with an increase in the number of neurons to be handled (increase in the value of n). If registers which hold indexes are placed, register area increases with an increase in the number of bits included in an index. This leads to an increase in chip area. With the information processing apparatus 10a the updated neuron selection circuit 12a generates an index on the basis of determination signals outputted by the Ising units 11b1 through 11bn. This obviates the need to place registers which hold indexes. As a result, the chip area of the Ising units 11b1 through 11bn is reduced.

Each selection circuit illustrated in FIG. 6 or FIG. 9 selects one of two determination signals. However, each selection circuit may select one of three or more determination signals. Alternatively, plural kinds of selection circuits which select one of different numbers of determination signals may mingle.

Third Embodiment

Figure 10:
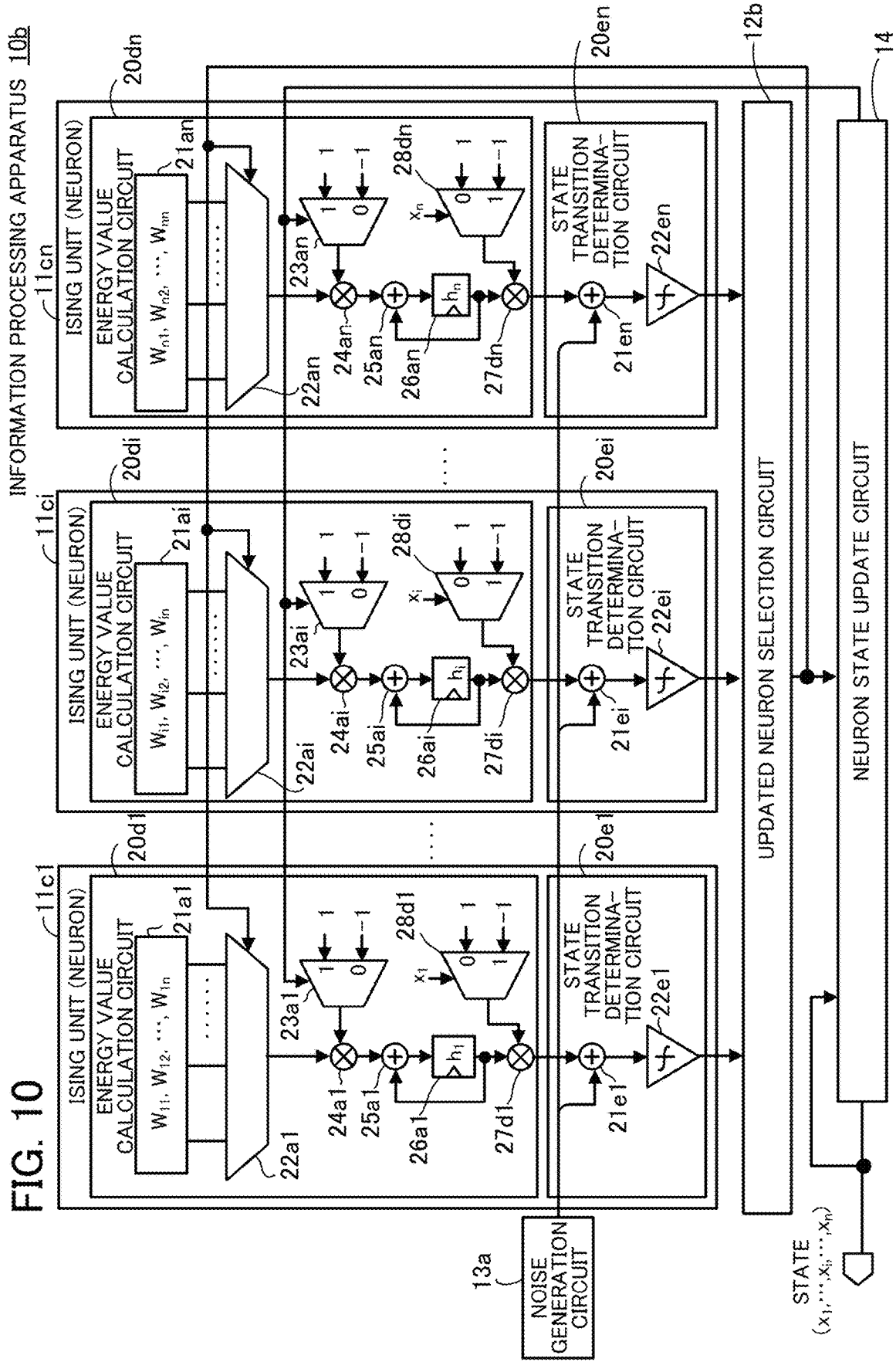
FIG. 10 illustrates an example of an information processing apparatus according to a third embodiment.

FIG. 10 illustrates an example of an information processing apparatus according to a third embodiment. Components in FIG. 10 which are the same as those of the information processing apparatus 10 according to the first embodiment illustrated in FIG. 1 are marked with the same numerals.

Ising units 11c1, ..., 11ci, ..., and 11cn of an information processing apparatus 10b according to a third embodiment include energy value calculation circuits 20d1, ..., 20di, ..., and 20dn and state transition determination circuits 20e1, ..., 20ei, ..., and 20en respectively.

Description will now be given with the energy value calculation circuit 20di and the state transition determination circuit 20ei of the Ising unit 11ci as an example.

The energy value calculation circuit 20di calculates a change amount $\Delta E_i$ of total energy of a neural network at the time of a change in the state of a neuron whose index is i. This change amount $\Delta E_i$ is given by the above expression (4).

The energy value calculation circuit 20di includes a multiplier 27di and a selection circuit 28di in addition to the components of the energy value calculation circuit 20ai illustrated in FIG. 1.

The multiplier 27di outputs as the change amount $\Delta E_i$ the product of a local field value $h_i$ outputted by a register 26ai and a value outputted by the selection circuit 28di.

When a state value $x_i$ after a change in state of the neuron whose index is i is 0, the selection circuit 28di outputs 1. When a state value $x_i$ after a change in state of the neuron whose index is i is 1, the selection circuit 28di outputs −1. An output of the selection circuit 28di corresponds to $\delta x_i$ ($=1-2x_i$) of expression (4). The state value $x_i$ after a change is supplied from, for example, a neuron state update circuit 14.

On the basis of the change amount $\Delta E_i$ and a noise value, the state transition determination circuit 20ei outputs a determination signal indicative of whether or not a change in the state value $x_i$ is possible.

The state transition determination circuit 20ei includes an adder 21ei and a comparator circuit 22ei.

The adder 21ei adds a noise value outputted by a noise generation circuit 13a to the change amount $\Delta E_i$ outputted by the multiplier 27di and outputs a value obtained.

When the value outputted by the adder 21ei is greater than or equal to a threshold (0, for example), the comparator circuit 22ei outputs as a determination signal 0 which is indicative that the state of the neuron whose index is i does not change. When the value outputted by the adder 21ei is smaller than the threshold, the comparator circuit 22ei outputs as a determination signal 1 which is indicative that a change in the state of the neuron whose index is i is possible.

The same circuit structure is also adopted in the Ising units 11c1 through 11cn other than the Ising unit 11ci.

That is to say, like the energy value calculation circuit 20di, the energy value calculation circuit 20d1 of the Ising unit 11c1 also includes a multiplier 27d1 and a selection circuit 28d1 and calculates a change amount $\Delta E_1$ of total energy at the time of a change in the state of a neuron whose index is 1. Furthermore, like the state transition determination circuit 20ei, the state transition determination circuit 20e1 of the Ising unit 11c1 also includes an adder 21e1 and a comparator circuit 22e1 and outputs a determination signal indicative of whether or not a change in a state value $x_1$ of the neuron whose index is 1 is possible.

Furthermore, like the energy value calculation circuit 20di, the energy value calculation circuit 20dn of the Ising unit 11cn also includes a multiplier 27dn and a selection circuit 28dn and calculates a change amount $\Delta E_n$ of total energy at the time of a change in the state of a neuron whose index is n. In addition, like the state transition determination circuit 20ei, the state transition determination circuit 20en of the Ising unit 11cn also includes an adder 21en and a comparator circuit 22en and outputs a determination signal indicative of whether or not a change in a state value $x_n$ of the neuron whose index is n is possible.

On the basis of determination signals outputted by the state transition determination circuits 20e1 through 20en of the Ising units 11c1 through 11cn respectively, an updated neuron selection circuit 12b generates and outputs an index of a neuron updating whose state value is allowed.

Figure 11:
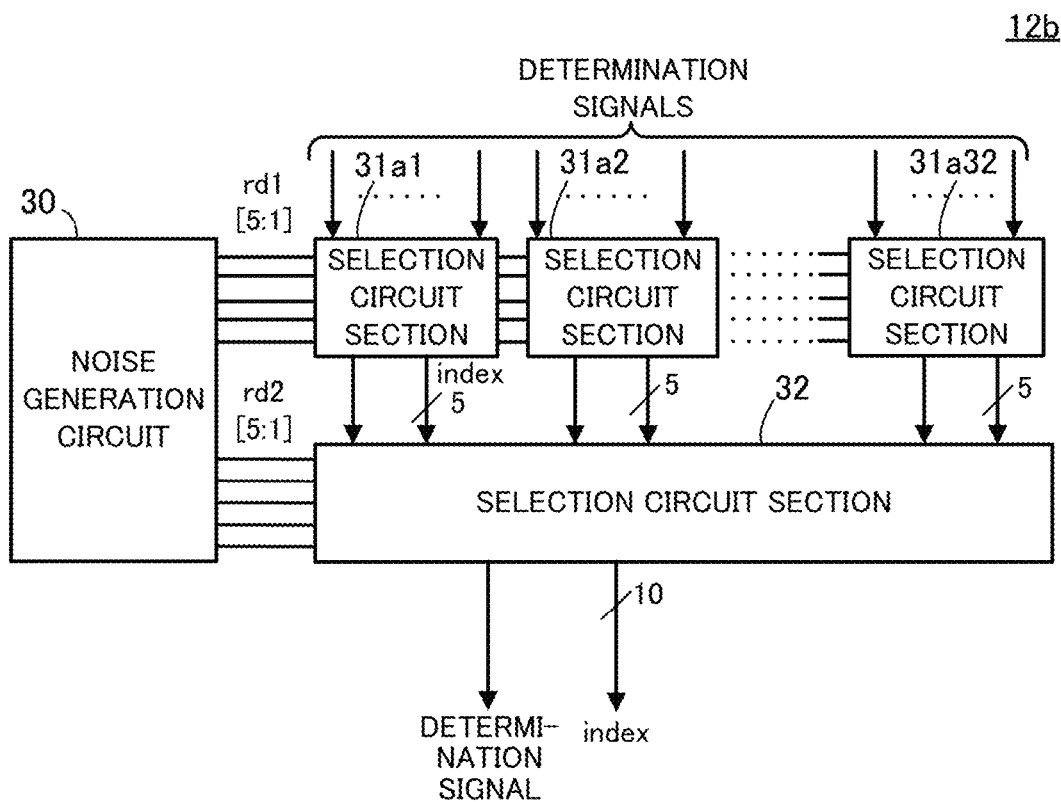
FIG. 11 illustrates an example of an updated neuron selection circuit in the third embodiment.

FIG. 11 illustrates an example of the updated neuron selection circuit in the third embodiment. Components in FIG. 11 which are the same as those of the updated neuron selection circuit 12a illustrated in FIG. 5 are marked with the same numerals.

The updated neuron selection circuit 12b illustrated in FIG. 11 differs from the updated neuron selection circuit 12a illustrated in FIG. 5 in that it does not include a pulse signal generation circuit 33 or a selection circuit 34. The updated neuron selection circuit 12b is the same as the updated neuron selection circuit 12a in the other respects and outputs a 10-bit index. A selection circuit section 32 outputs a determination signal. In this embodiment, however, this determination signal is not used. Therefore, there is no need for the selection circuit section 32 to output a determination signal. This is the same with the second embodiment.

The neuron state update circuit 14 of the information processing apparatus 10b illustrated in FIG. 10 receives an index outputted by the updated neuron selection circuit 12b and outputs a state value after update of a neuron designated by the index.

Figure 12:
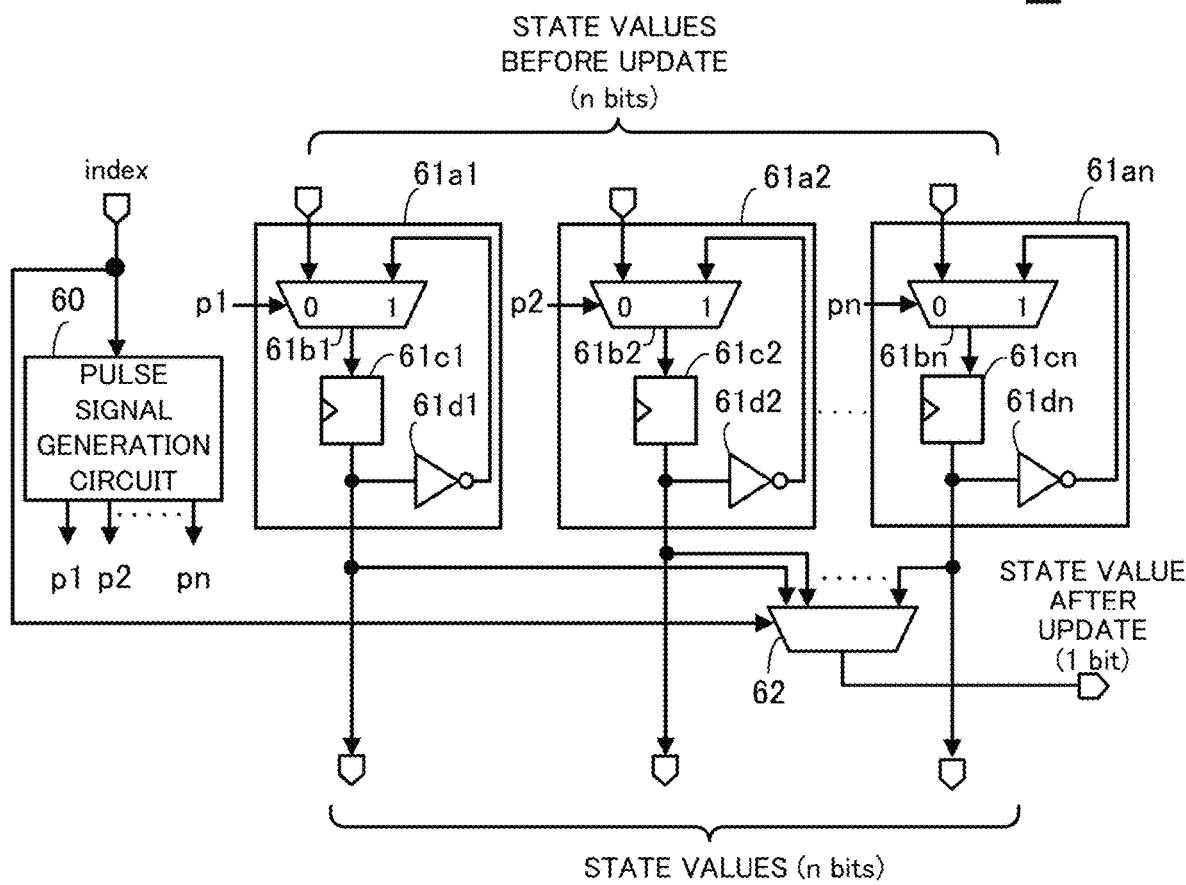
FIG. 12 illustrates an example of a neuron state update circuit.

FIG. 12 illustrates an example of the neuron state update circuit.

The neuron state update circuit 14 includes a pulse signal generation circuit 60, circuit sections 61a1, 61a2, . . . , and 61an, and a selection circuit 62.

The pulse signal generation circuit 60 receives an index outputted by the updated neuron selection circuit 12b and makes one of pulse signals p1, p2, . . . , and pn corresponding to the index an H level ("1").

The circuit sections 61a1 through 61an generate, on the basis of the pulse signals p1 through pn outputted by the pulse signal generation circuit 60 respectively, state values obtained by updating one bit of state values (n bits) before update of n neurons and output the state values.

For example, the circuit section 61a1 includes a selection circuit 61b1, a register 61c1, and an inverter circuit 61d1.

When the pulse signal p1 is 0, the selection circuit 61b1 selects and outputs a state value before update of the neuron whose index is 1. When the pulse signal p1 is 1, the selection circuit 61b1 selects and outputs an output signal of the inverter circuit 61d1.

The register 61c1 is, for example, a flip-flop. The register 61c1 stores a value outputted by the selection circuit 61b1 in synchronization with a clock signal (not illustrated) and outputs the value. An initial value of a value stored in the register 61c1 is, for example, an initial value of the state value $x_1$ of the neuron whose index is 1.

The inverter circuit 61d1 outputs a value obtained by inverting the logical level of the value outputted by the register 61c1. An output of the inverter circuit 61d1 may be used as a selection signal of the selection circuit 28d1 of the Ising unit 11c1 illustrated in FIG. 10, that is to say, a state value $x_1$ after a change.

When the pulse signal p1 is 0, the circuit section 61a1 selects and outputs the state value before update. When the pulse signal p1 is 1, the circuit section 61a1 selects and outputs a value obtained by inverting the logical level of the state value before update.

The circuit structure of the circuit sections 61a2 through 61an is the same as that of the circuit section 61a1.

That is to say, like the circuit section 61a1, the circuit section 61a2 also includes a selection circuit 61b2, a register 61c2, and an inverter circuit 61d2. When the pulse signal p2 is 0, the circuit section 61a2 selects and outputs a state value before update of a neuron whose index is 2. When the pulse signal p2 is 1, the circuit section 61a2 selects and outputs a value obtained by inverting the logical level of the state value before update.

Furthermore, like the circuit section 61a1, the circuit section 61an also includes a selection circuit 61bn, a register 61cn, and an inverter circuit 61dn. When the pulse signal pn is 0, the circuit section 61an selects and outputs a state value before update of the neuron whose index is n. When the pulse signal pn is 1, the circuit section 61an selects and outputs a value obtained by inverting the logical level of the state value before update.

The selection circuit 62 receives an index outputted by the updated neuron selection circuit 12b and outputs as a state value after update a value of a bit, of an n-bit state value outputted by the circuit sections 61a1 through 61an, corresponding to the index.

Example of Operation of Information Processing Apparatus According to Third Embodiment The information processing apparatus 10b according to the third embodiment also operates in accordance with the flow of, for example, the process illustrated in FIG. 2. That is to say, first, for example, a control unit (not illustrated) sets weighting values corresponding to a problem to be calculated in registers 21a1 through 21an (step S1) and the Ising units 11c1 through 11cn are initialized (step S2). In step S2, for example, bias values are set in registers 26a1 through 26an and initial values are set in the registers 61c1 through 61cn of the neuron state update circuit 14 illustrated in FIG. 12.

After that, simulated annealing is performed under the control of the control unit (step S3).

At the time of the simulated annealing, the noise generation circuit 13a gradually decreases noise width under the control of the control unit.

The noise generation circuit 13a in the third embodiment generates a noise value so that the probability that output values of the comparator circuits 22e1 through 22en become 1 will follow, for example, the Metropolis-Hastings transition rule stated in the above literature "Equation of State Calculations by Fast Computing Machines". The Metropolis-Hastings transition rule is used, for example, at the time of calculating the properties of a substance.

The Metropolis-Hastings probability transition function is expressed as $$F(\Delta E) = \min[1, \exp(-\beta \cdot \Delta E)] \tag{7}$$

where $\beta = 1/T$.

In order to meet the condition that the probability that output values of the comparator circuits 22e1 through 22en become 1 makes a transition in accordance with the Metropolis-Hastings transition rule, a noise value ns is expressed from expression (7) as $$ns = F^{-1}(x)$$

where $F^{-1}(x)$ is an inverse function of expression (7) and x is a uniform random number and meets $0 \leq x \leq 1$.

The noise generation circuit 13a which outputs the above noise value ns is realized by, for example, the following circuit structure.

Figure 13:
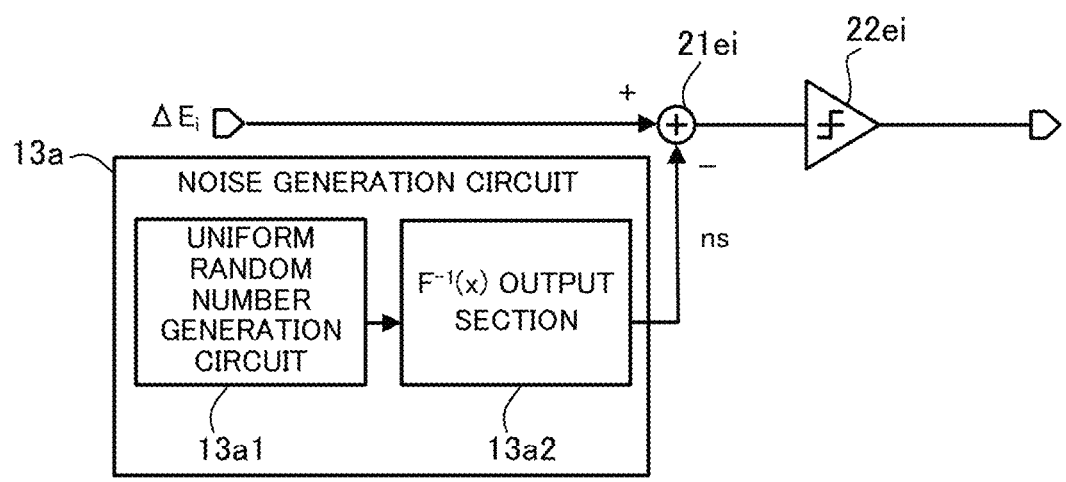
FIG. 13 illustrates an example of a noise generation circuit.

FIG. 13 illustrates an example of the noise generation circuit.

The noise generation circuit 13a includes a uniform random number generation circuit 13a1 and an $F^{-1}(x)$ output section 13a2.

The uniform random number generation circuit 13a1 generates and outputs a uniform random number value x which meets $0 \leq x \leq 1$.

The $F^{-1}(x)$ output section 13a2 inputs the uniform random number value x and outputs $F^{-1}(x)$ as the noise value ns on the basis of data in a table indicative of the relationship between x and $F^{-1}(x)$ stored in advance in, for example, a memory.

In the example of FIG. 13, the noise value ns is inputted to the adder 21ei of the state transition determination circuit 20ei of the Ising unit 11ci. The adder 21ei supplies to the comparator circuit 22ei a value obtained by subtracting the noise value ns from a change amount $\Delta E_i$ calculated by the energy value calculation circuit 20*di* (value obtained by adding the negative noise value ns to the change amount $\Delta E_i$).

With the information processing apparatus 10*b* according to the third embodiment the above noise value ns is used for performing the simulated annealing in step S3 of FIG. 2.

At the time of the simulated annealing, each of the state transition determination circuits 20*e*1 through 20*en* determines whether or not there is a neuron a change in whose state value is possible (step S4). If there is no neuron whose state value changes, then step S6 is performed. If there is a neuron a change in whose state value is possible, then the updated neuron selection circuit 12*b* selects one neuron a change in whose state value is possible and allows updating the state value (step S5). For example, if in step S5 there are a plurality of neurons a change in whose state values is possible, then the updated neuron selection circuit 12*b* randomly selects one of them by the circuit illustrated in FIG. 11 and outputs an index of the selected neuron. Furthermore, the neuron state update circuit 14 outputs a state value after update of the neuron designated by the index. After step S5 is performed, step S3 is performed again.

If there is no neuron a change in whose state value is possible, then the control unit determines whether or not the states of the n neurons have converged (step S6). For example, when state values of the n neurons do not change for a certain period, the control unit determines that the states of the n neurons have converged, makes the information processing apparatus 10*b* output the state values of all the neurons (combination of the state values) as a solution (step S7), and ends the process. For example, when state values of the n neurons change in the certain period, the process is repeated from step S3. The information processing apparatus 10*b* may output the states of all the neurons to the outside of the information processing apparatus 10*b* or store the states of all the neurons in a memory (not illustrated) in the information processing apparatus 10*b*.

The same effect that is obtained by the information processing apparatus 10 according to the first embodiment is achieved by the above information processing apparatus 10*b* according to the third embodiment. That is to say, the updated neuron selection circuit 12*b* selects a neuron updating whose state value is allowed. At this time the updated neuron selection circuit 12*b* detects neurons a change in whose state values is possible on the basis of a noise value and a change amount of total energy and selects one of them. This increases the probability that a state transition will occur, and improves calculation speed. Furthermore, if there are a plurality of neurons a change in whose state values is possible, one of them is selected and updating its state value is allowed. This suppresses deterioration of convergence.

In addition, when a state value of some neuron is updated, a neuron, of the n neurons, a change in whose state value is possible is checked at once in parallel by the Ising units 11*c*1 through 11*cn*. That is to say, a plurality of neighbor states to which the transition may be made from the current state are checked at once in parallel. This enables high-speed processing corresponding to the number of the Ising units 11*c*1 through 11*cn* (connected in parallel).

Furthermore, with the information processing apparatus 10*b* according to the third embodiment the updated neuron selection circuit 12*b* generates an index. This obviates the need to place in the Ising units 11*c*1 through 11*cn* registers which hold indexes. This is the same with the information processing apparatus 10*a* according to the second embodiment. As a result, the chip area of the Ising units 11*c*1 through 11*cn* is reduced.

Moreover, the information processing apparatus 10*b* calculates a change amount of total energy. Accordingly, a more universal transition rule is applicable. For example, the Metropolis-Hastings transition rule using the probability transition function represented by a change amount of total energy indicated by expression (7) is applicable. As a result, with the information processing apparatus 10*b* according to the third embodiment a transition rule to be applied is not limited to a transition rule using a sigmoid function. Thus, the information processing apparatus 10*b* according to the third embodiment is able to flexibly accommodate various transition rules.

In the above description the number of neurons whose states are updated at one time is one with convergence taken into consideration. However, the updated neuron selection circuit 12*b* may output indexes of more than one neuron. In this case, the number of a plurality of neighbor states to which the transition may be made from the current state and which are to be checked is not n but N (>n). Therefore, Ising units which calculate a change amount $\Delta E$ at the time of a change in the states of more than one neuron are added.

Fourth Embodiment

Figure 14:
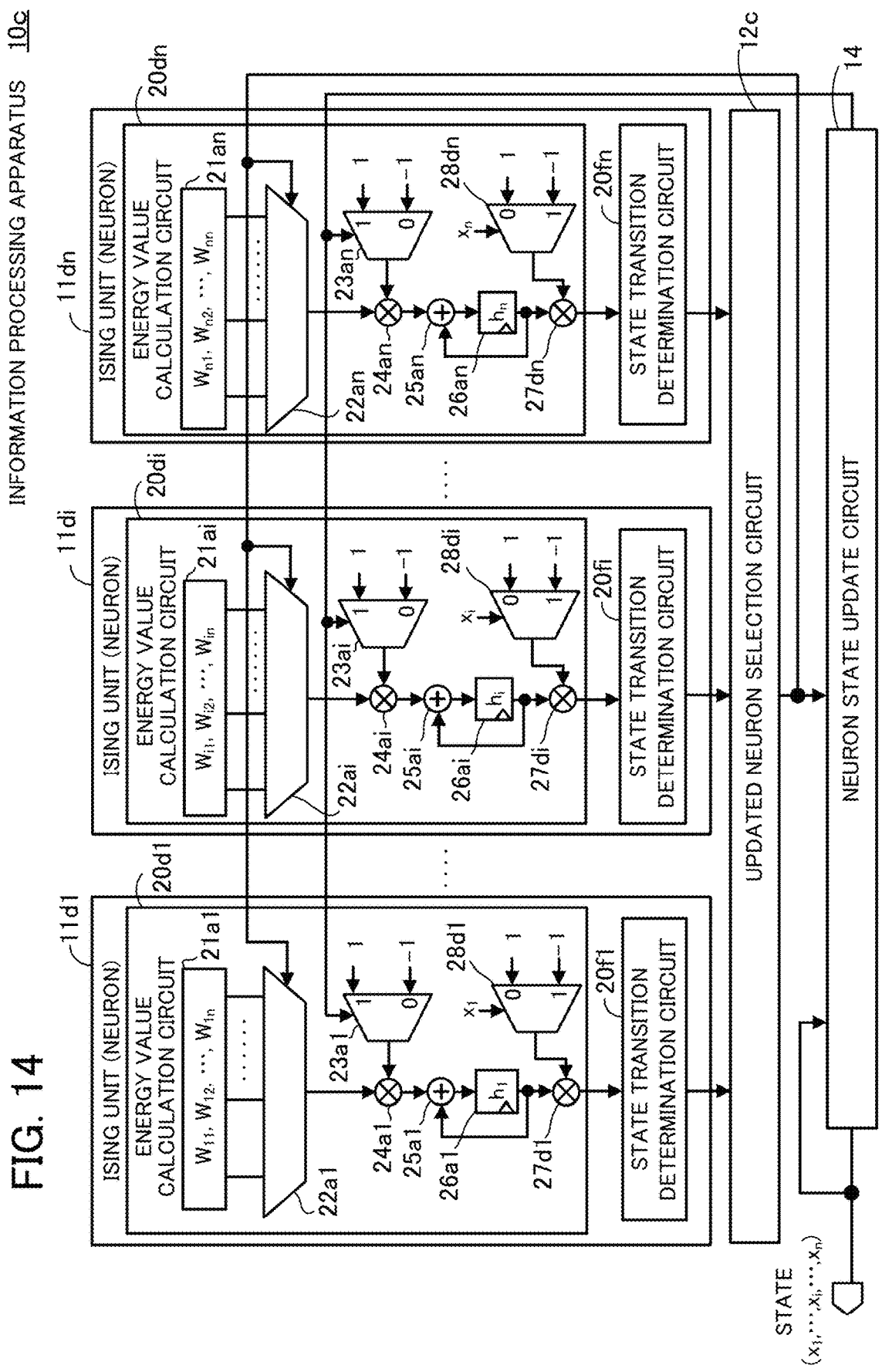
FIG. 14 illustrates an example of an information processing apparatus according to a fourth embodiment.

FIG. 14 illustrates an example of an information processing apparatus according to a fourth embodiment. Components in FIG. 14 which are the same as those of the information processing apparatus 10*b* according to the third embodiment are marked with the same numerals.

Ising units 11*d*1, ..., 11*di*, ..., and 11*dn* of an information processing apparatus 10*c* according to a fourth embodiment include energy value calculation circuits 20*d*1 through 20*dn* which are the same as the energy value calculation circuits 20*d*1 through 20*dn* of the Ising units 11*c*1 through 11*cn*, respectively, in the third embodiment. State transition determination circuits 20*f*, ..., 20*fi*, ..., and 20*fn* of the Ising units 11*d*1 through 11*dn* differ from the state transition determination circuits 20*e*1 through 20*en* of the Ising units 11*c*1 through 11*cn*, respectively, in the third embodiment.

The state transition determination circuits 20*f*1 through 20*fn* calculate, on the basis of change amounts of total energy, probability values at which updating the states of neurons whose indexes are 1 to n, respectively, is allowed and outputs, on the basis of the probability values, determination signal indicative of whether or not updating is possible. Calculation is performed so that as updating a state makes total energy lower, a probability value at which the updating is allowed becomes higher.

For example, a probability value $A_i$ at which updating a state value $x_i$ is allowed is given by the use of a change amount $\Delta E_i$ of total energy and a sigmoid function by $$A_i = \frac{1}{1 + \exp(\beta \cdot \Delta E_i)} \quad (8)$$

In addition, a probability value $P_i$ obtained by normalizing the probability value $A_i$ by adding together probability values at which updating the states of the n neurons is allowed is given by $$P_i = \frac{A_i}{\sum_i A_i} \qquad (9)$$

On the basis of the above expression (9), the state transition determination circuits 20/1 through 20/fn and an updated neuron selection circuit 12c of the information processing apparatus 10c according to the fourth embodiment generate and output an index of a neuron the probability value $P_i$ at which updating whose state is allowed becomes higher.

Figure 15:
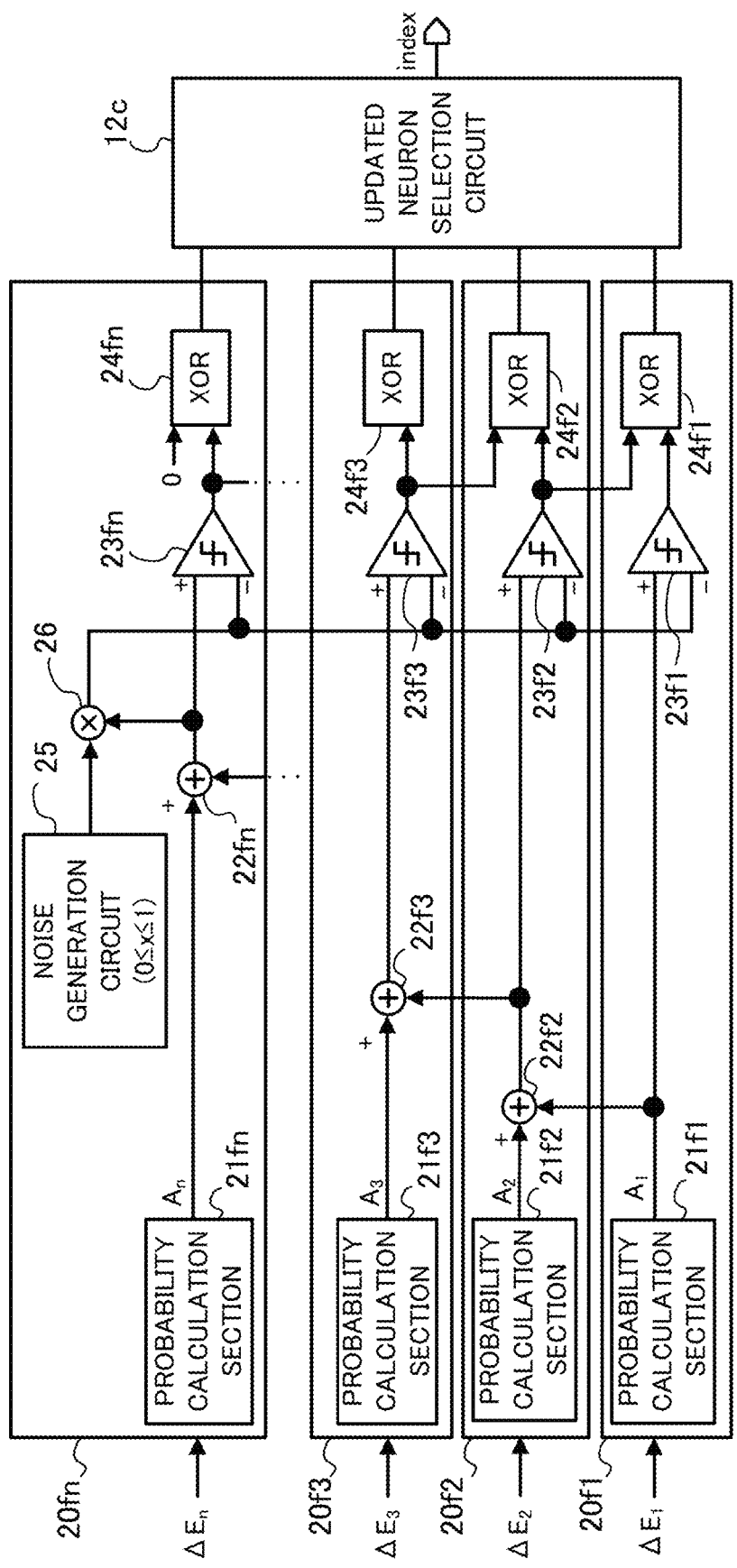
FIG. 15 illustrates an example of a state transition determination circuit.

FIG. 15 illustrates an example of the state transition determination circuit.

The state transition determination circuit 20/1 includes a probability calculation section 21/1, a comparator circuit 23/1, and an XOR circuit 24/1. The state transition determination circuit 20/2 includes a probability calculation section 21/2, an adder 22/2, a comparator circuit 23/2, and an XOR circuit 24/2. The state transition determination circuit 20/3 includes a probability calculation section 21/3, an adder 22/3, a comparator circuit 23/3, and an XOR circuit 24/3. The state transition determination circuit 20/fn includes a probability calculation section 21/fn, an adder 22/fn, a comparator circuit 23/fn, an XOR circuit 24/fn, a noise generation circuit 25, and a multiplier 26. The state transition determination circuits 20/4 through 20/(n−1) (not illustrated) include the same components that are included in the state transition determination circuits 20/2 and 20/3.

On the basis of a change amount $\Delta E_i$ (i=1 to n), the probability calculation section 21/fi(i=1 to n) calculates a probability value $A_i$ (i=1 to n) given by expression (8). On the basis of data in a table indicative of the relationship between $\Delta E_i$ (i=1 to n) and a probability value $A_i$ (i=1 to n) stored in advance in, for example, a memory, the probability calculation section 21fi calculates (or determines) a probability value $A_i$.

The adder 22fi (i=2 to n) outputs a result obtained by adding together a probability value $A_i$ and a probability value $A_{i-1}$. Each time the value of i increases by one, the bit width of an output of the adder 22fi increases by one. For example, if the adder 22/2 is a circuit which performs a fixed-point calculation in 16 bits, then the adder 22/3 is a circuit which performs a fixed-point calculation in 17 bits.

When a probability value $A_i$ is greater than an output value of the multiplier 26, the comparator circuit 23fi(i=1 to n) outputs 1. When the probability value $A_i$ is smaller than or equal to the output value of the multiplier 26, the comparator circuit 23fi outputs 0.

The XOR circuit 24fi(i=1 to n) outputs as a determination signal the exclusive OR of an output signal of the comparator circuit 23fi and an output signal of the comparator circuit 23f(i+1). However, the XOR circuit 24fn outputs as a determination signal the exclusive OR of an output signal of the comparator circuit 23fn and 0.

The noise generation circuit 25 generates and outputs as a noise value a uniform random number value x which meets 0≤x≤1. The noise generation circuit 25 may be outside the Ising unit 11dn.

The multiplier 26 multiplies an integrated value of a probability value $A_i$ (i=1 to n) outputted by the adder 22fn by the uniform random number value x and outputs a multiplication result. A single-precision floating-point multiplier standardized in IEEE754 may be used as the multiplier 26.

With the above state transition determination circuits 20/1 through 20/fn, as i of the adder 22fi (i=2 to n) becomes greater, an output value of the adder 22fi becomes greater. An output signal of each of the comparator circuits 23f(i+1) through 23fn, of the comparator circuits 23/1 through 23/fn, whose i's are greater than i of the comparator circuit 23fi becomes 1. At this time, a determination signal outputted by the XOR circuit 24f(i−1) becomes 1 and the other determination signals become 0.

For example, when output signals of the comparator circuits 23/1 and 23/2 are 0 and output signals of the comparator circuits 23/3 through 23fn are 1, determination signal outputted by the XOR circuits 24/1 and 24/3 through 24fn becomes 0 and a determination signal outputted by the XOR circuit 24/2 becomes 1.

On the basis of determination signals outputted by the state transition determination circuits 20/1 through 20fn, the updated neuron selection circuit 12c outputs an index of an updated neuron. For example, when a determination signal outputted by the state transition determination circuit 20/2 is 1, the updated neuron selection circuit 12c outputs index=2.

Example of Operation of Information Processing Apparatus According to Fourth Embodiment With the information processing apparatus 10c according to the fourth embodiment setting weighting values and initialization are also performed in accordance with the flow chart illustrated in FIG. 2 (steps S1 and S2). With the information processing apparatus 10c, however, a uniform random number value x generated by the noise generation circuit 25 is updated under the control of a control unit (not illustrated) in place of the simulated annealing in step S3.

In step S4, the state transition determination circuits 20/1 through 20fn determine, on the basis of change amounts $\Delta E_1$ through $\Delta E_n$ outputted by the energy value calculation circuits 20d1 through 20dn, whether or not there is a neuron updating whose state value decreases energy. For example, when all determination signals outputted by the state transition determination circuits 20/1 through 20fn are 0, step S6 is performed. When one of determination signals outputted by the state transition determination circuits 20/1 through 20fn is 1, in step S5 the updated neuron selection circuit 12c outputs an index of a neuron corresponding an Ising unit which outputs the determination signal. The neuron state update circuit 14 outputs a state value after update of the neuron designated by the index. The information processing apparatus 10c allows in this way updating the state of one neuron.

After step S5 is performed, the process is repeated from step S3. If there is no determination signal which is 1, then the control unit determines whether or not the states of the n neurons have converged (step S6). For example, when state values of the n neurons do not change for a certain period, the control unit determines that the states of the n neurons have converged, makes the information processing apparatus 10c output the state values of all the neurons (combination of the state values) as a solution (step S7), and ends the process. For example, when state values of the n neurons change in the certain period, the process is repeated from step S3. The information processing apparatus 10c may output the states of all the neurons to the outside of the information processing apparatus 10c or store the states of all the neurons in a memory (not illustrated) in the information processing apparatus 10c.

On the basis of change amounts of total energy at the time of a change in neurons whose indexes are 1 to n, the above information processing apparatus 10c according to the fourth embodiment calculates probability values at which updating states of the neurons whose indexes are 1 to n is allowed. Calculation is performed so that as updating a state makes total energy lower, a probability value at which the updating is allowed becomes higher. The probability that a neuron for which a probability value is large is selected by the state transition determination circuits 20f1 through 20fn and the updated neuron selection circuit 12c becomes high. This improves the convergence of calculation and enables a high-speed calculation.

The state transition determination circuits 20f1 through 20fn may be placed outside the Ising units 11d1 through 11dn respectively.

A circuit (hereinafter referred to as an update detection and index selection circuit) which selects an index by stages may be used in place of the state transition determination circuits 20f1 through 20fn and the updated neuron selection circuit 12c.

If an index is selected by stages with a probability proportional to a probability value $A_i$ (i=1 to n) given by expression (8), then the following procedure, for example, is adopted. It is assumed that a group G0 is formed of n indexes as members. First the update detection and index selection circuit divides the n indexes in half, forms two groups, and selects one of the two groups by the use of a uniform random number value. It is assumed that the selected group is a group G1. The update detection and index selection circuit further divides n/2 indexes included in the group G1 in half, forms two groups, and selects one of the two groups by the use of a uniform random number value. This process is repeated and a group including one index is finally obtained. For example, when n=1024, a probability value $p_k$ at which index=k included in a group G10 finally obtained is selected is given by $$P_k = \frac{\sum_{i \in G1} A_i}{\sum_{i \in G0} A_i} \cdot \frac{\sum_{i \in G2} A_i}{\sum_{i \in G1} A_i} \cdots \frac{\sum_{i \in G10} A_i}{\sum_{i \in G9} A_i} = \frac{\sum_{i \in G10} A_i}{\sum_{i \in G0} A_i} = \frac{A_k}{\sum_{i \in G0} A_i} \quad (10)$$

The above selection process may be performed on a small group. An example of an update detection and index selection circuit which selects one index from each group including two indexes will now be described.

Figure 16:
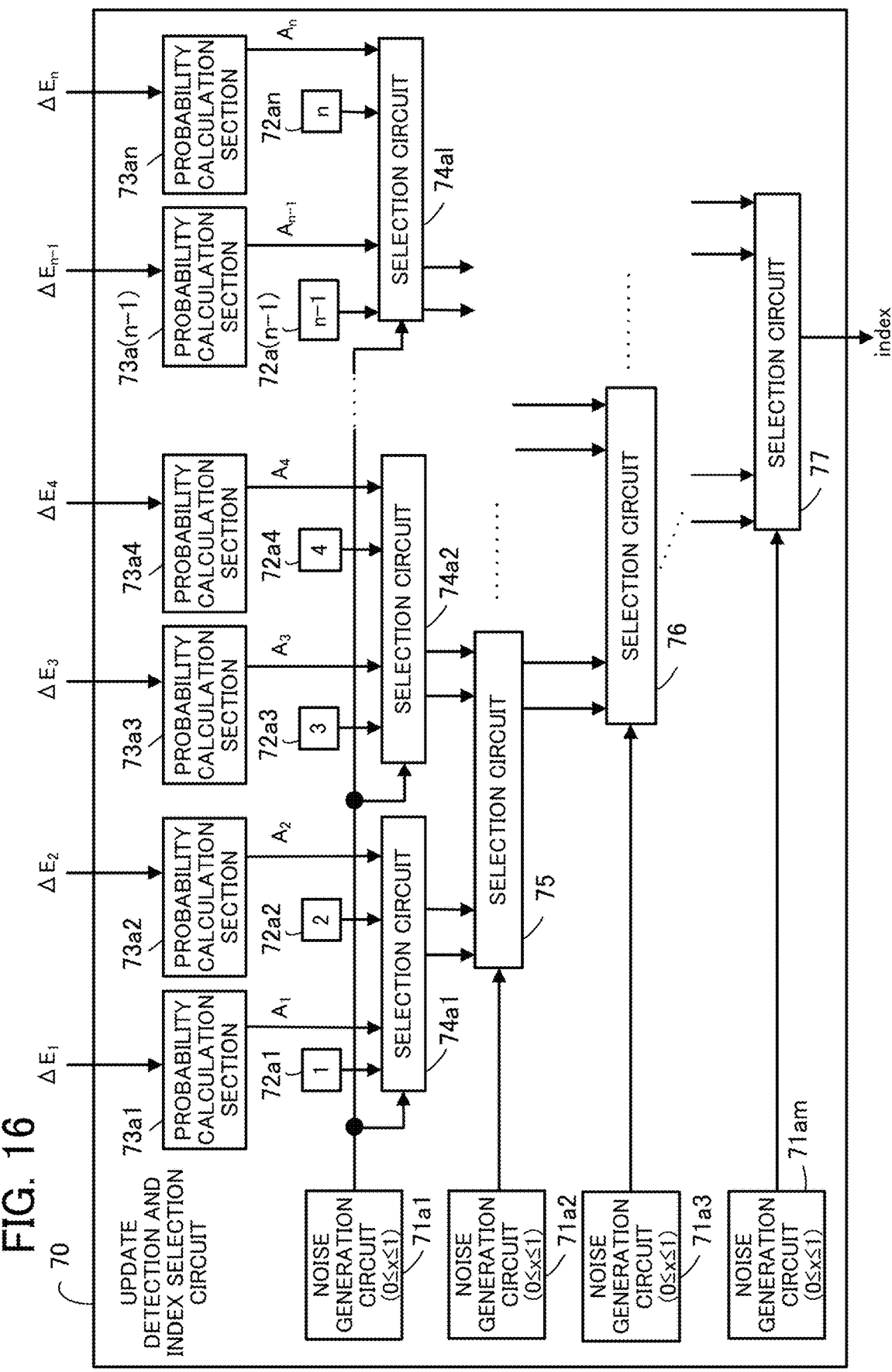
FIG. 16 illustrates an example of an update detection and index selection circuit.

FIG. 16 illustrates an example of an update detection and index selection circuit.

An update detection and index selection circuit 70 includes noise generation circuits 71a1, 71a2, 71a3, ..., and 71am and registers 72a1, 72a2, 72a3, 72a4, ..., 72a(n-1), and 72an. Furthermore, the update detection and index selection circuit 70 includes probability calculation sections 73a1, 73a2, 73a3, ..., 73a(n-1), and 73an and selection circuits 74a1, 74a2, ..., 74a1, 75, 76, and 77. The selection circuits 74a1 through 74a1, 75, 76, and 77 are connected to form an m-stage tree structure.

The noise generation circuits 71a1 through 71am supply to the selection circuits at the m stages uniform random number values x which differ in seed (initial value) and which meet 0≤x≤1. For example, the noise generation circuit 71a1 supplies a uniform random number value x to the selection circuits 74a1 through 74a1 at the first stage and the noise generation circuit 71am supplies a uniform random number value x to the selection circuit 77 at the mth stage.

Indexes (1 to n) of neurons are stored in the registers 72a1 through 72an respectively. The probability calculation sections 73a1 through 73an calculate a probability value $A_i$ (i=1 to n) given by expression (8) on the basis of change amounts $\Delta E_1$ through $\Delta E_n$, respectively, of total energy.

The number of the selection circuits 74a1 through 74a1 at the first stage is n/2. Each of the selection circuits 74a1 through 74a1 at the first stage acquires two indexes and two probability values $A_i$ and $A_{i+1}$, selects and outputs one index on the basis of the uniform random number value x, and outputs an addition value obtained by adding together the two probability values $A_i$ and $A_{i+1}$.

The number of selection circuits at the second stage including the selection circuit 75 is n/4. Each of the 4/n selection circuits acquires two indexes and two addition values outputted by two selection circuits at the first stage, selects and outputs one index on the basis of the uniform random number value x, and outputs a new addition value obtained by adding together the two addition values.

The number of selection circuits at the third stage including the selection circuit 76 is n/8. Each of the 4/8 selection circuits acquires two indexes and two addition values outputted by two selection circuits at the second stage, selects and outputs one index on the basis of the uniform random number value x, and outputs a new addition value obtained by adding together the two addition values.

The selection circuit 77 is at the mth stage. The selection circuit 77 acquires two indexes and two addition values outputted by two selection circuits at the (m-1)th stage and selects and outputs one index on the basis of the uniform random number value x.

Figure 17:
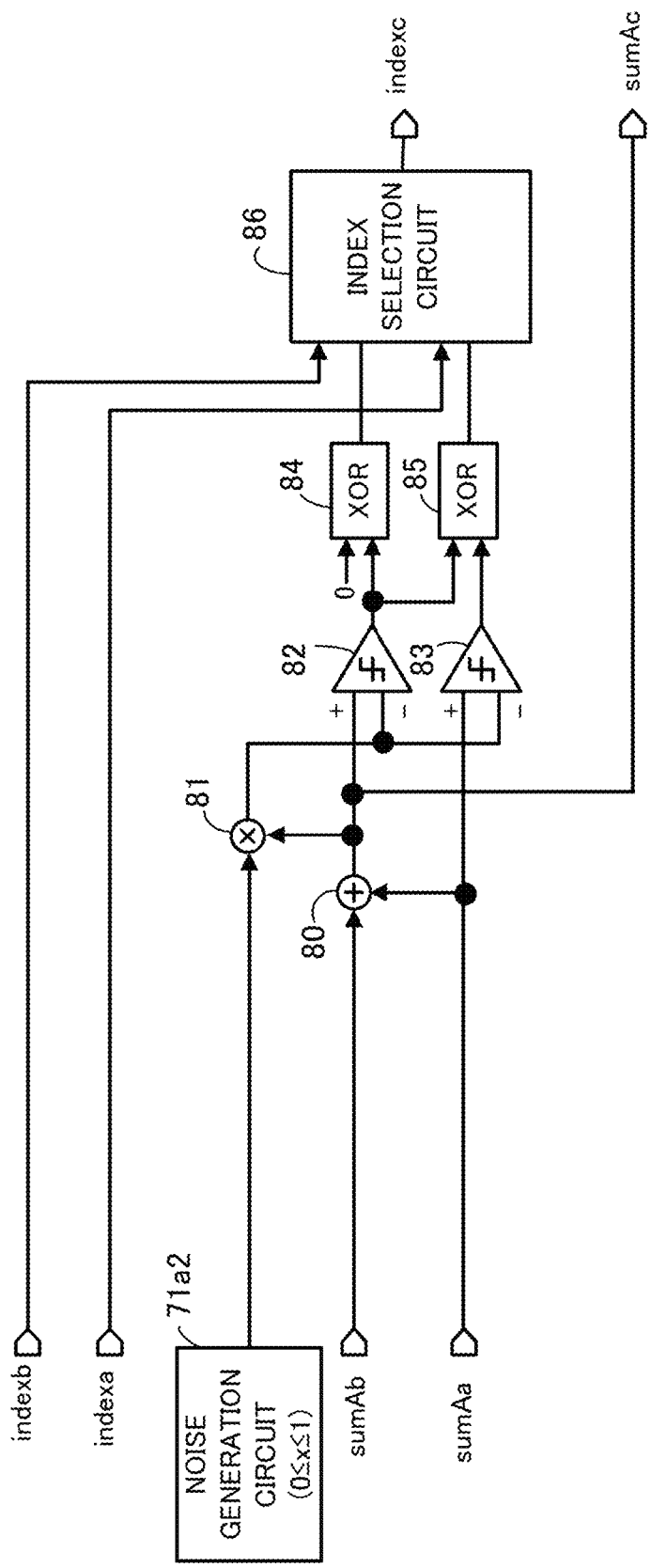
FIG. 17 illustrates an example of a selection circuit.

FIG. 17 illustrates an example of a selection circuit.

FIG. 17 illustrates an example of the selection circuit 75 illustrated in FIG. 16. The other selection circuits are also realized by the same circuit structure.

The selection circuit 75 includes an adder 80, a multiplier 81, comparator circuits 82 and 83, XOR circuits 84 and 85, and an index selection circuit 86.

The adder 80 adds together an addition result sumAa outputted by the selection circuit 74a1 and an addition result sumAb outputted by the selection circuit 74a2 and outputs an addition result sumAc.

The multiplier 81 outputs a multiplication result obtained by multiplying the uniform random number value x and the addition result sumAc together.

When the addition result sumAc is greater than the multiplication result outputted by the multiplier 81, the comparator circuit 82 outputs 1. When the addition result sumAc is smaller than or equal to the multiplication result outputted by the multiplier 81, the comparator circuit 82 outputs 0.

When the addition result sumAa is greater than the multiplication result outputted by the multiplier 81, the comparator circuit 83 outputs 1. When the addition result sumAa is smaller than or equal to the multiplication result outputted by the multiplier 81, the comparator circuit 83 outputs 0.

The XOR circuit 84 outputs the exclusive OR of an output signal of the comparator circuit 82 and 0.

The XOR circuit 85 outputs the exclusive OR of the output signal of the comparator circuit 82 and an output signal of the comparator circuit 83.

The index selection circuit 86 receives an index (indicated by indexa in FIG. 17) outputted by the selection circuit 74a1 and an index (indicated by indexb in FIG. 17) outputted by the selection circuit 74a2. When an output signal of the XOR circuit 85 is 1, the index selection circuit 86 selects indexa and outputs it as indexc. When an output signal of the XOR circuit 84 is 1, the index selection circuit 86 selects indexb and outputs it as indexc.

The same effect that is obtained by the information processing apparatus 10c according to the fourth embodiment is achieved by the use of the above update detection and index selection circuit 70.

Each selection circuit illustrated in FIG. 16 selects one of two indexes. However, each selection circuit may select one of three or more indexes. Alternatively, plural kinds of selection circuits which select one of different numbers of indexes may mingle.

The information processing apparatus 10, 10a, 10b, and 10c according to the first through fourth embodiments, respectively, which have been described may also be realized by a field-programmable gate array (FPGA).

Figure 18:
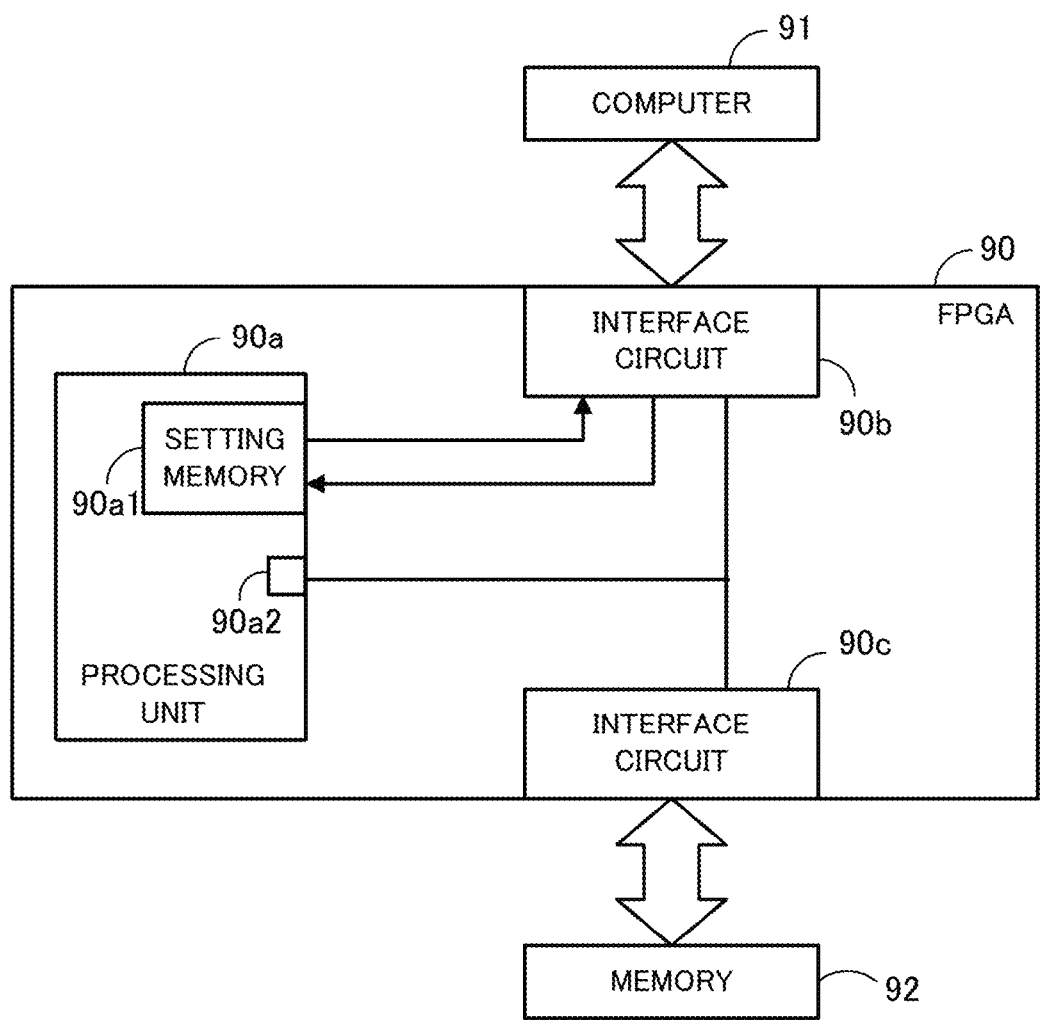
FIG. 18 illustrates an example of an FPGA.

FIG. 18 illustrates an example of an FPGA.

An FPGA 90 includes a processing unit (engine) 90a and interface circuits 90b and 90c.

The internal structure of the processing unit 90a is defined by set values stored in a setting memory (configuration memory) 90a1 in the processing unit 90a. The set values stored in the setting memory 90a1 may be rewritten via the interface circuit 90b by an external computer 91. Furthermore, the processing unit 90a includes an interface circuit 90a2 and transmits information to or receives information from the interface circuit 90b or 90c. The interface circuit 90c transmits information to or receives information from a memory 92 such as a double-data-rate (DDR) memory.

The information processing apparatus 10, 10a, 10b, and 10c according to the first through fourth embodiments, respectively, may be built in the processing unit 90a.

An optimization problem, such as a traveling salesman problem, is calculated at a high speed by the use of the above information processing apparatus 10, 10a, 10b, and 10c according to the first through fourth embodiments respectively.

With the information processing apparatus 10a according to the second embodiment, for example, the following effect is obtained. The number of cycles (number of cycles of a clock signal supplied to the registers 26a1 through 26an and the like) needed for the convergence of the calculation of the traveling salesman problem decreases in proportion to the number of the Ising units 11b1 through 11bn (connected in parallel).

Figure 19:
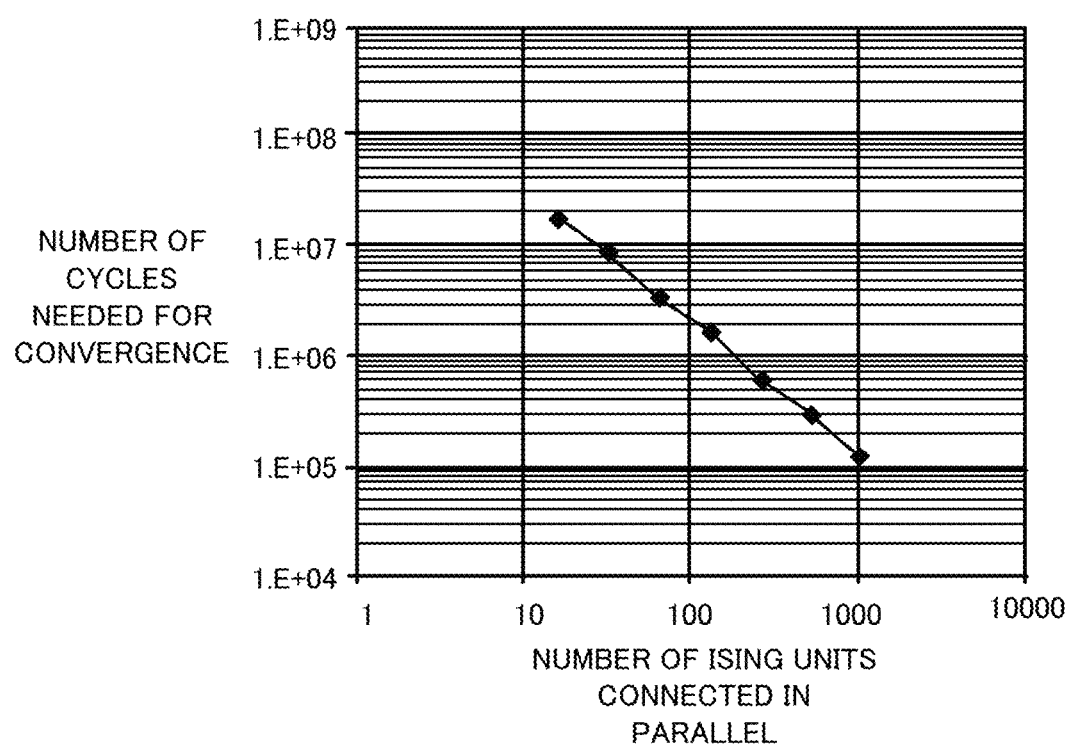
FIG. 19 is an example of a simulation result indicative of the relationship between the number of cycles needed for the convergence of the calculation of a traveling salesman problem and the number of Ising units connected in parallel.

FIG. 19 is an example of a simulation result indicative of the relationship between the number of cycles needed for the convergence of the calculation of the traveling salesman problem and the number of Ising units connected in parallel.

In FIG. 19, a vertical axis indicates the number of cycles needed for convergence and a horizontal axis indicates the number of Ising units connected in parallel. FIG. 19 illustrates an example of the relationship between the number of cycles needed for convergence and the number of Ising units connected in parallel at the time of calculating the traveling salesman problem in which the number of cities is 32 by the use of the information processing apparatus 10a according to the second embodiment.

As can be seen from FIG. 19, a decrease in the number of cycles needed for convergence is approximately proportional to the number of Ising units connected in parallel.

One aspect of the information processing apparatus, the Ising unit, and the information processing apparatus control method according to the present invention have been described on the basis of the embodiments. However, these embodiments are simple examples and the present invention is not limited to the above description.

According to one aspect, calculation speed is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a plurality of Ising units each including:
a calculation circuit which calculates a second energy value obtained by updating, based on a piece of first identification information of an updated neuron whose state is updated among a plurality of second neurons coupled with a first neuron of a plurality of neurons and a second state value indicative of a state of the updated neuron, a first energy value calculated based on a sum total of values obtained by multiplying a plurality of first state values indicative of states of the plurality of second neurons by weighting values corresponding to the plurality of second neurons among a plurality of weighting values each indicative of a coupling strength between the first neuron and one of the plurality of second neurons; and
a state transition determination circuit which outputs a determination signal indicative of a determination result of determining, based on the second energy value or a change amount of an energy function of a neural network at the time of a change in a state of the first neuron and a first noise value, whether a change in a third state value indicative of a state of the first neuron is possible, the plurality of Ising units outputting determination signals regarding different first neurons; and
an updated neuron selection circuit which selects a first neuron of the plurality of neurons, for which the change in the third state value is determined to be possible, based on the determination signals outputted by the plurality of Ising units and which outputs a piece of second identification information of the selected first neuron as the piece of first identification information.

2. The information processing apparatus according to claim 1, wherein the state transition determination circuit determines, based on a change in a comparison result obtained by comparing an addition result obtained by adding together the second energy value and the first noise value with a threshold, whether a change in the third state value is possible.

3. The information processing apparatus according to claim 1, wherein the state transition determination circuit determines, based on a change in a comparison result obtained by comparing an addition result obtained by adding together the change amount of the energy function of the neural network and the first noise value with a threshold, whether a change in the third state value is possible.

4. The information processing apparatus according to claim 1, wherein, when there are a plurality of first neurons for which a change in the third state value is determined to be possible, the updated neuron selection circuit selects one of the plurality of first neurons based on a second noise value and outputs a piece of second identification information of the selected first neuron as the piece of first identification information.

5. The information processing apparatus according to claim 4, wherein:
the updated neuron selection circuit includes a plurality of selection circuits connected to form a plural-stage tree structure;
each of a plurality of first selection circuits at a first stage, of the plurality selection circuits, receives two or more of the determination signals outputted by the plurality of Ising units and generates the piece of second identification information corresponding to a determination signal selected based on the second noise value from the two or more determination signals;
each of a plurality of second selection circuits at second and later stages, of the plurality of selection circuits, receives two or more of determination signals selected by the plurality of first selection circuits or a plurality of third selection circuits at a preceding stage and two or more pieces of second identification information and selects one of the two or more determination signals and one of the two or more pieces of second identification information based on the second noise value; and
a piece of second identification information selected by a third selection circuit at a last stage, of the plurality of second selection circuits, is the piece of first identification information.

6. The information processing apparatus according to claim 1, wherein the state transition determination circuit calculates, based on the change amount of the energy function of the neural network, a probability value at which update of the state of the first neuron is allowed and outputs the determination signal based on the first noise value and the probability value.

7. An Ising unit comprising:
a calculation circuit which calculates a second energy value obtained by updating, based on a piece of first identification information of an updated neuron whose state is updated among a plurality of second neurons coupled with a first neurons of a plurality of neurons and a second state value indicative of a state of the updated neuron, a first energy value calculated based on a sum total of values obtained by multiplying a plurality of first state values indicative of states of the plurality of second neurons by weighting values corresponding to the plurality of second neurons among a plurality of weighting values each indicative of a coupling strength between the first neuron and one of the plurality of second neurons; and
a state transition determination circuit which outputs a determination signal indicative of a determination result of determining, based on the second energy value or a change amount of an energy function of a neural network at the time of a change in a state of the first neuron and a noise value, whether a change in a third state value indicative of a state of the first neuron is possible.

8. An information processing apparatus control method comprising
selecting, by an updated neuron selection circuit, a first neuron for which a change in a third state value is determined to be possible, from a plurality of neurons, based on determination signals outputted by a plurality of Ising units and supplying a piece of second identification information of the selected first neuron as a piece of first identification information, each of the plurality of Ising units including:
a calculation circuit which calculates a second energy value obtained by updating, based on the piece of first identification information of an updated neuron whose state is updated among a plurality of second neurons coupled with a first neuron of the plurality of neurons and a second state value indicative of a state of the updated neuron, a first energy value calculated based on a sum total of values obtained by multiplying a plurality of first state values indicative of states of the plurality of second neurons by weighting values corresponding to the plurality of second neurons, among a plurality of weighting values each indicative of a coupling strength between the first neuron and one of the plurality of second neurons; and
a state transition determination circuit which outputs a determination signal indicative of a determination result of determining, based on the second energy value or a change amount of an energy function of a neural network at the time of a change in a state of the first neuron and a noise value, whether a change in the third state value indicative of a state of the first neuron is possible, the plurality of Ising units outputting determination signals regarding different first neurons.

* * * * *